(12) United States Patent
Umebayashi et al.

(10) Patent No.: US 8,147,921 B2
(45) Date of Patent: *Apr. 3, 2012

(54) INK SET FOR INKJET RECORDING AND INKJET RECORDING METHOD

(75) Inventors: Tsutomu Umebayashi, Ashigarakami-gun (JP); Tokihiko Matsumura, Ashigarakami-gun (JP)

(73) Assignee: Fujifilm Corporation, Tokyo (JP)

(*) Notice: Subject to any disclaimer, the term of this patent is extended or adjusted under 35 U.S.C. 154(b) by 828 days.

This patent is subject to a terminal disclaimer.

(21) Appl. No.: 12/059,211

(22) Filed: Mar. 31, 2008

(65) Prior Publication Data

US 2008/0239045 A1  Oct. 2, 2008

(30) Foreign Application Priority Data

Mar. 30, 2007  (JP) .................. 2007-090682

(51) Int. Cl.
*B41J 2/01* (2006.01)
*B05D 1/26* (2006.01)

(52) U.S. Cl. .......... 427/466; 347/100; 347/102; 522/16; 522/26; 522/75; 522/83

(58) Field of Classification Search .................. 427/466; 522/39, 16, 26, 64, 53, 63, 182; 347/100, 347/102

See application file for complete search history.

(56) References Cited

U.S. PATENT DOCUMENTS

| | | | |
|---|---|---|---|
| 4,134,813 A | 1/1979 | Kuesters et al. | |
| 4,318,791 A * | 3/1982 | Felder et al. | 522/33 |
| 6,019,992 A | 2/2000 | Carson et al. | |
| 6,528,232 B1 | 3/2003 | Maeda et al. | |
| 6,660,374 B2 * | 12/2003 | Smetana et al. | 428/327 |
| 6,790,895 B2 * | 9/2004 | Stelandre et al. | 524/436 |
| 7,341,828 B2 * | 3/2008 | Katoh et al. | 430/270.11 |
| 7,354,957 B2 * | 4/2008 | Herlihy | 522/53 |
| 7,520,601 B2 * | 4/2009 | Claes et al. | 347/102 |
| 7,723,397 B2 * | 5/2010 | Husler et al. | 522/36 |
| 7,806,508 B2 * | 10/2010 | Hirato | 347/35 |
| 7,946,698 B2 * | 5/2011 | Makuta et al. | 347/101 |
| 7,946,699 B2 * | 5/2011 | Nakazawa et al. | 347/102 |
| 2004/0246319 A1 * | 12/2004 | Ito et al. | 347/100 |
| 2008/0180503 A1 * | 7/2008 | Umebayashi | 347/102 |

FOREIGN PATENT DOCUMENTS

| | | |
|---|---|---|
| DE | 100 54 550 A1 | 5/2001 |
| EP | 1 757 457 A1 | 2/2007 |
| JP | 63-045272 A | 2/1988 |
| JP | 63-060783 A | 3/1988 |
| JP | 08-174997 A | 7/1996 |
| JP | 09-268186 A | 10/1997 |
| JP | 2003-145745 A | 5/2003 |
| JP | 2004-018546 A | 1/2004 |
| JP | 2004-042525 A | 2/2004 |
| JP | 2004-042548 A | 2/2004 |
| JP | 2005-096254 A | 4/2005 |
| JP | 2006-137183 A | 6/2006 |
| JP | 2006-137185 A | 6/2006 |

OTHER PUBLICATIONS

Machine Translation from Patent Abstract of Japan website of Publication No. JP 2003-145745, pp. 1-15 and Abstract, May 21, 2003.*
European Search Report dated Jul. 17, 2008.

* cited by examiner

*Primary Examiner* — Susan W Berman
(74) *Attorney, Agent, or Firm* — Sughrue Mion, PLLC

(57) ABSTRACT

An ink set for inkjet recording is provided that includes at least a colored liquid comprising at least a radically polymerizable compound, a photopolymerization initiator, and a colorant and an undercoat liquid comprising at least a radically polymerizable compound and a photopolymerization initiator, the undercoat liquid comprising a sensitizer represented by Formula (I) below.

(I)

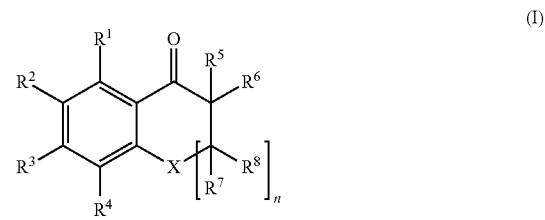

In Formula (I) above, X denotes O, S, or NR, n denotes 0 or 1, R denotes a hydrogen atom, an alkyl group, or an acyl group, and $R^1$, $R^2$, $R^3$, $R^4$, $R^5$, $R^6$, $R^7$, and $R^8$ independently denote a hydrogen atom or a monovalent substituent. There is also provided an inkjet recording method employing the ink set for inkjet recording, the method including a step of applying the undercoat liquid on top of a recording medium, a step of semi-curing the undercoat liquid, and a step of carrying out image formation by discharging the colored liquid on top of the semi-cured undercoat liquid.

21 Claims, 6 Drawing Sheets

INK SET FOR INKJET RECORDING AND INKJET RECORDING METHOD

BACKGROUND OF THE INVENTION

1. Field of the Invention

The present invention relates to an ink set for inkjet recording and an inkjet recording method.

2. Description of the Related Art

Inkjet systems, in which ink is discharged as droplets from an ink discharge orifice, are employed in many printers for reasons such as small size, low cost, and an ability to form an image without contacting a recording medium. Among these inkjet systems, a piezo inkjet system, in which ink is discharged by utilizing deformation of a piezoelectric element, and a thermal inkjet system, in which droplets of ink are discharged by utilizing the phenomenon of boiling of the ink by means of thermal energy, are characterized by their high resolution and high speed printing properties.

At present, when printing by means of an inkjet printer, which involves ink droplets being fired onto plain paper or a non-absorbing recording medium such as a plastic, high speed, high image quality, and good fixation to the recording medium are important issues.

The inkjet recording method forms lines or images from ink droplets by discharging the droplets according to image data onto a recording medium; in particular, if, when recording is carried out on the non-absorbing recording medium, it takes a long time for drying of the fired droplets or penetration thereof into the recording medium, there are the practical problems that the image easily spreads, and adjacent ink droplets on the recording medium mix together, thereby preventing a sharp image from being formed. When there is mixing between liquid droplets, liquid droplets fired next to each other are combined, move, and are displaced from the positions they landed, thus causing nonuniformity in line width when drawing fine lines and causing uneven color, etc. when drawing a colored surface (hereinafter, called 'fired droplet interference'). Furthermore, there is the problem that, since the degrees to which nonuniformity in line width and uneven color on a colored surface occur vary depending on the ink absorbability and wettability of the recording medium surface, even if the ink used and its discharge conditions are the same, images vary between various types of recording medium.

Moreover, in addition to the above-mentioned problems, an image recorded on a non-absorbing recording medium has problems in terms of image fixation, such as it being easily peeled off and having poor scratch resistance.

As a method for solving the above-mentioned problems, various techniques have so far been proposed.

As an example thereof, in order to impart high definition printing performance, two reactive liquid inks are used, and they are reacted on a recording medium; for example, there have been disclosed a method in which, after a liquid containing a basic polymer is applied, recording is carried out using an ink containing an anionic dye (ref. e.g. JP-A-63-60783 (JP-A denotes a Japanese unexamined patent application publication)), and a method in which, after a liquid composition containing a cationic substance is applied, an ink containing an anionic compound and a coloring material is applied (ref. e.g. JP-A-8-174997).

Furthermore, there has been proposed an inkjet recording method in which a UV-curing ink is used as an ink, dots of the UV-curing ink discharged onto a recording medium are irradiated with ultraviolet rays that match the discharge timing, thus pre-curing them to such a degree that the viscosity increases and adjacent dots do not mix together, and they are then further irradiated with ultraviolet rays and fully cured (ref. e.g. JP-A-2004-42548).

Moreover, there has been proposed a technique in which, after a radiation curing type white ink is applied uniformly on a transparent or semi-transparent non-absorbing recording medium as an undercoat layer and solidified or made to have an increased viscosity by exposure to radiation, inkjet recording is carried out using a radiation curing type color ink set, thus improving the color ink visibility, spreading, and the problem that images vary between various recording media (ref. e.g. JP-A-2003-145745 and JP-A-2004-42525). Furthermore, there has also been proposed a technique in which, instead of the radiation curing type white ink above, a substantially transparent actinic radiation curing type ink is applied by an inkjet head (ref. e.g. JP-A-2005-96254, JP-A-2006-137185, and JP-A-2006-137183).

BRIEF SUMMARY OF THE INVENTION

However, in accordance with the method described in JP-A-8-174997, although the problems such as fired droplet interference and spreading can be avoided for a specific substrate, the method is inadequate from the viewpoint of image fixation. On the other hand, in accordance with the method described in JP-A-2004-42548, although spreading is suppressed and image fixation is improved, there is still the problem that images vary between various recording media, and the method is inadequate for solving nonuniformity in line width, color unevenness, etc. due to mixing of droplets. Furthermore, the methods described in JP-A-2003-145745 and JP-A-2004-42525 are inadequate for solving nonuniformity in line width, color unevenness, etc. due to mixing of droplets.

Moreover, the methods described in JP-A-2005-96254, JP-A-2006-137185, and JP-A-2006-137183 still have problems such as nonuniformity in line width and color unevenness due to mixing of droplets. Furthermore, when a radical polymerization type ink set described in JP-A-2005-96254 is used, curing of the ink is insufficient, thus causing problems such as tackiness of a cured coating or peeling of a coating. In accordance with the method described in JP-A-2006-137185, it is difficult for ink dots to be joined together; when the amount of ink applied is small, the color density might decrease, and when the amount of ink applied is increased, the problem of a relief feel occurs. Moreover, when a radiation curable liquid layer or an ink set described in JP-A-2006-137185 or JP-A-2006-137183 is used, when the amount of ink liquid applied per unit pixel is increased or the concentration of the colorant contained in the ink is increased in order to print a high density image or a high saturation image, curing of the interior of the coating might be insufficient. If the concentration of a sensitizer, for example, a thioxanthone compound, described in JP-A-2006-137185 and JP-A-2006-137183 is increased (e.g. 4 wt % or higher) in order to improve internal curability of the coating, the radiation curable liquid layer or transparent ink might be colored yellow, thus causing poor color reproduction, which is undesirable in terms of image design. Furthermore, in this case, there is a problem with storage stability in cold districts (−15° C. or below), and the thioxanthone compound might precipitate in some cases.

The present invention has been accomplished in the light of the above-mentioned problems, and it is an object thereof to provide an ink set for inkjet recording and an inkjet recording method that can suppress ink spreading effectively for any non-absorbing recording medium, give high image uniformity between various recording media, suppress the occurrence of nonuniformity in line width, color unevenness, etc. due to fired droplet interference, and give excellent fixation of an image to a recording medium and excellent color reproduction and storage stability.

The above-mentioned object of the present invention has been attained by means described in (1) and (12) below. These are described below together with (2) to (11) and (13) to (17), which are preferred embodiments.

(1) An ink set for inkjet recording, comprising at least a colored liquid comprising at least a radically polymerizable compound, a photopolymerization initiator, and a colorant and an undercoat liquid comprising at least a radically polymerizable compound and a photopolymerization initiator, the undercoat liquid comprising a sensitizer represented by Formula (I) below,

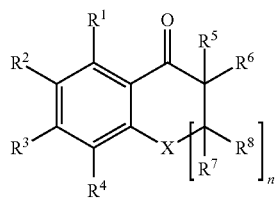
(I)

in Formula (I) above, X denotes O, S, or NR, n denotes 0 or 1, R denotes a hydrogen atom, an alkyl group, or an acyl group, and $R^1$, $R^2$, $R^3$, $R^4$, $R^5$, $R^6$, $R^7$, and $R^8$ independently denote a hydrogen atom or a monovalent substituent, (2) the ink set for inkjet recording according to (1), wherein the sensitizer represented by Formula (I) above is represented by Formula (I-C),

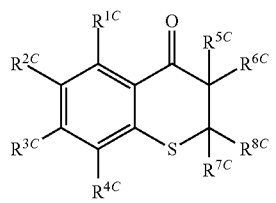
(I-C)

in Formula (I-C) above, $R^{1C}$, $R^{2C}$, $R^{3C}$, $R^{4C}$, $R^{5C}$, $R^{6C}$, $R^{7C}$, and $R^{8C}$ independently denote a hydrogen atom, a halogen atom, an alkyl group, a hydroxy group, a cyano group, a nitro group, an amino group, an alkylthio group, an alkylamino group, an alkoxy group, an alkoxycarbonyl group, an acyloxy group, an acyl group, a carboxyl group, or a sulfo group, (3) the ink set for inkjet recording according to (1) or (2), wherein the amount added of the sensitizer represented by Formula (I) above is 0.1 to 15.0 wt % relative to the total weight of the undercoat liquid, (4) the ink set for inkjet recording according to any one of (1) to (3), wherein the undercoat liquid comprises as the photopolymerization initiator at least one type of compound selected from the group consisting of an acylphosphine oxide compound and an α-aminoacetophenone compound, (5) the ink set for inkjet recording according to (4), wherein the α-aminoacetophenone compound is represented by Formula (d) below,

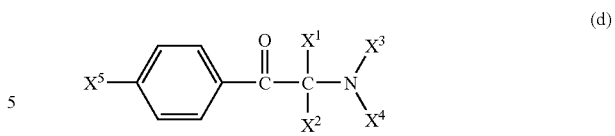
(d)

in Formula (d), $X^1$ and $X^2$ independently denote a methyl group, an ethyl group, or a benzyl group, —$NX^3X^4$ denotes a dimethylamino group, a diethylamino group, or a morpholino group, $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group, and the benzyl group may be substituted with an alkyl group having at least 1 but no greater than 4 carbons, (6) the ink set for inkjet recording according to (4), wherein the acylphosphine oxide compound is represented by Formula (2) or Formula (3),

(2)

in Formula (2), $R^1$ and $R^2$ independently denote an aliphatic group, an aromatic group, an aliphatic oxy group, an aromatic oxy group, or a heterocyclic group, $R^3$ denotes an aliphatic group, an aromatic group, or a heterocyclic group, $R^1$ and $R^2$ may be bonded to form a 5-membered to 9-membered ring, and the ring structure may be a heterocycle having an oxygen atom, a nitrogen atom, a sulfur atom, etc. in the ring structure,

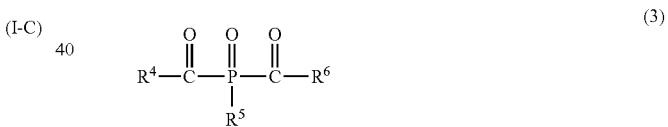
(3)

in Formula (3), $R^4$ and $R^6$ independently denote an alkyl group, an aryl group, or a heterocyclic group, and $R^5$ denotes an alkyl group, an aryl group, an alkoxy group, an aryloxy group, or a heterocyclic group, (7) the ink set for inkjet recording according to any one of (1) to (6), wherein the colored liquid comprises a sensitizer represented by Formula (I) above, (8) the ink set for inkjet recording according to any one of (1) to (7), wherein the colored liquid comprises as the photopolymerization initiator at least one type of compound selected from the group consisting of an acylphosphine oxide compound and an α-aminoacetophenone compound, (9) the ink set for inkjet recording according to any one of (1) to (8), wherein the undercoat liquid comprises a surfactant,

(10) the ink set for inkjet recording according to any one of (1) to (9), wherein when the surface tension of the colored liquid is γA and the surface tension of the undercoat liquid is γB, γA>γB is satisfied,

(11) the ink set for inkjet recording according to (10), wherein the surface tension (γA) of the colored liquid and the surface tension (γB) of the undercoat liquid satisfy γA−γB≧2,

(12) an inkjet recording method employing the ink set for inkjet recording according to any one of (1) to (11), the method comprising a step of applying the undercoat liquid on top of a recording medium, a step of semi-curing the undercoat liquid, and a step of carrying out image formation by discharging the colored liquid on top of the semi-cured undercoat liquid,

(13) the inkjet recording method according to (12), wherein when a secondary color is formed using a colored liquid A and a colored liquid B having different colors, the method comprises a step of semi-curing the colored liquid A, and a step of discharging the colored liquid B on top of the semi-cured colored liquid A,

(14) the inkjet recording method according to (12) or (13), wherein the semi-curing step is a step of semi-curing by irradiation with actinic radiation,

(15) the inkjet recording method according to any one of (12) to (14), wherein the semi-curing step is a step of irradiating with UV rays,

(16) the inkjet recording method according to any one of (12) to (15), wherein UV rays for semi-curing the undercoat liquid and/or UV rays for semi-curing colored liquid A comprise UV rays having a wavelength of at least 340 nm but no greater than 400 nm, and

(17) the inkjet recording method according to any one of (12) to (16), wherein the amount of undercoat liquid applied to the recording medium is at least 0.05 times but no greater than 5 times the maximum amount of colored liquid applied.

BEST MODE FOR CARRYING OUT THE INVENTION

Figure 1:
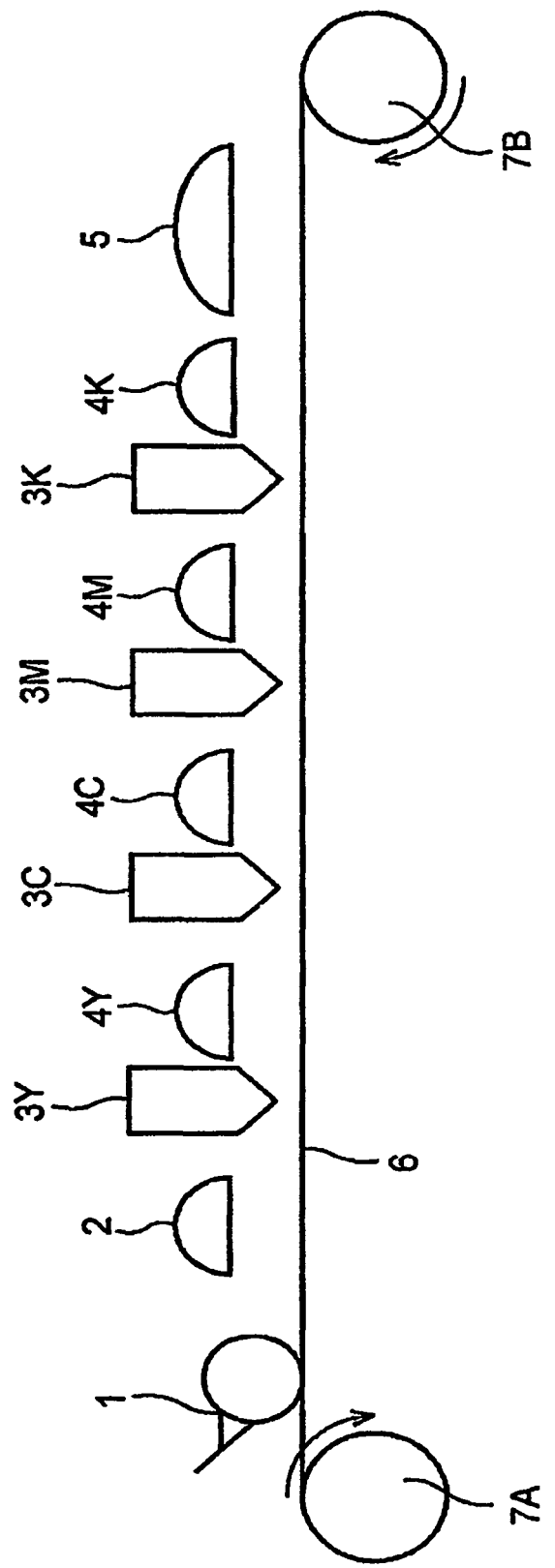
FIG. 1 shows a schematic diagram of an inkjet recording method that can suitably be used in the present invention.

The present invention is explained in detail below.

(1) Ink Set for Inkjet Recording

The ink set for inkjet recording of the present invention comprises at least a colored liquid comprising at least a radically polymerizable compound, a photopolymerization initiator, and a colorant, and an undercoat liquid comprising at least a radically polymerizable compound and a photopolymerization initiator, the undercoat liquid comprising a sensitizer represented by Formula (I) below.

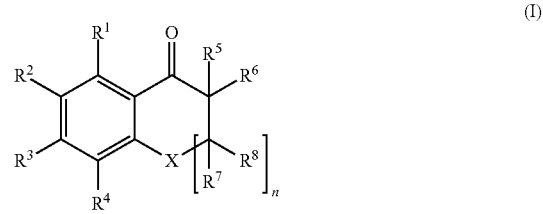

In Formula (I) above, X denotes O, S, or NR. n denotes 0 or 1. R denotes a hydrogen atom, an alkyl group, or an acyl group. $R^1$, $R^2$, $R^3$, $R^4$, $R^5$, $R^6$, $R^7$, and $R^8$ independently denote a hydrogen atom or a monovalent substituent.

In accordance with use of this ink set for inkjet recording, ink spreading is suppressed effectively for any non-absorbing recording medium, image uniformity is high between various types of recording medium and, moreover, the occurrence of nonuniformity in line width, color unevenness, etc. due to fired droplet interference (mixing between droplets) can be suppressed.

The main requirements with respect to the constitution of the ink set for inkjet recording of the present invention are explained in detail below.

Colored Liquid

Among liquid compositions constituting the ink set for inkjet recording of the present invention (the liquid compositions referred to in the present invention are a general term for the colored liquid and the undercoat liquid), the colored liquid comprises at least a radically polymerizable compound, a photopolymerization initiator, and a colorant.

From the viewpoint of image fixation the concentration added of the radically polymerizable compound in the colored liquid is preferably at least 40 wt % but no greater than 98 wt % (in the present invention, 'at least 40 wt % but no greater than 95 wt %' is written as '40 to 95 wt %' or '40 wt % to 95 wt %', the same applies below) relative to the total weight of the colored liquid, more preferably 50 to 95 wt %, and particularly preferably 60 to 90 wt %. It is preferable for the amount of radically polymerizable compound added to be in the above-mentioned range since the curability is excellent and the viscosity is appropriate.

The concentration of the photopolymerization initiator added is, relative to the total weight of the colored liquid, preferably 0.1 to 20.0 wt %, more preferably 0.5 to 18.0 wt %, and yet more preferably 1.0 to 15.0 wt %. It is preferable for the amount of photopolymerization initiator added to be in the above-mentioned range since the curability is excellent and it is appropriate from the viewpoint of surface tackiness being suppressed.

The concentration added of the colorant in the colored liquid is preferably no greater than 50 wt % relative to the total weight of the colored liquid, more preferably 1 to 30 wt %, and yet more preferably 2 to 20 wt %. It is preferable for the amount of colorant added to be in the above-mentioned range since good image density and storage stability can be obtained.

From the viewpoint of internal curability of a coating (discharged liquid droplets) being improved, the colored liquid preferably comprises as a sensitizer a sensitizer represented by Formula (I) above. With regard to the sensitizer, one type may be used on its own or two or more types may be used in combination.

The concentration of the sensitizer contained in the colored liquid is, relative to the total weight of the colored liquid, preferably 0.1 to 15.0 wt %, more preferably 0.5 to 10.0 wt %, and yet more preferably 1.0 to 8.0 wt %. It is preferable for the amount added to be in the above-mentioned range since good internal curability can be obtained for the coating (discharged liquid droplets). When two or more types of the sensitizers are used, the total amount thereof is preferably in the above-mentioned range.

Furthermore, from the viewpoint of further improving the internal curability of a coating (discharged liquid droplets), the colored liquid preferably comprises as the photopolymerization initiator at least one type of compound selected from the group consisting of an acylphosphine oxide compound and an α-aminoacetophenone compound. The colored liquid may comprise one of the acylphosphine oxide compound and the α-aminoacetophenone compound, or both in combination.

The concentration of said at least one type of compound selected from the group consisting of an acylphosphine oxide compound and an α-aminoacetophenone compound contained in the colored liquid is, relative to the total weight of the colored liquid, preferably 0.1 to 20.0 wt %, more preferably 0.5 to 18.0 wt %, and yet more preferably 1.0 to 15.0 wt %. It is preferable for the amount added to be in the above-mentioned range since good internal curability can be obtained for the coating (discharged liquid droplets). When two or more types of compounds selected from the group consisting of an acylphosphine oxide compound and an α-aminoacetophenone compound are used, the total amount thereof is preferably in the above-mentioned range.

The colored liquid may be liquid at room temperature, but from the viewpoint of suitability for firing droplets by inkjet, it is preferable that the viscosity at 25° C. is no greater than 100 mPa·s or the viscosity at 60° C. is no greater than 30 mPa·s; it is more preferable that the viscosity at 25° C. is no greater than 60 mPa·s or the viscosity at 60° C. is no greater than 20 mPa·s, and it is yet more preferable that the viscosity at 25° C. is no greater than 40 mPa·s or the viscosity at 60° C. is no greater than 15 mPa·s.

Similarly, from the viewpoint of suitability for firing droplets by inkjet, the surface tension at 25° C. of the colored liquid is preferably 18 to 40 mN/m, more preferably 20 to 35 mN/m, and yet more preferably 22 to 32 mN/m.

The 'viscosity' referred to here is a viscosity determined using a model RE80 viscometer manufactured by Toki Sangyo Co., Ltd. The model RE80 viscometer is a conical rotor/flat plate system E-type viscometer, and measurement is carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

The surface tension referred to above is a value obtained by measuring at a liquid temperature of 25° C. by the Wilhelmy method using a standard surface tensiometer (e.g. a CBVP-Z surface tensiometer manufactured by Kyowa Interface Science Co., Ltd.).

Undercoat Liquid

Among the liquid compositions constituting the ink set for inkjet recording of the present invention, the undercoat liquid comprises at least a radically polymerizable compound, a photopolymerization initiator, and a sensitizer represented by Formula (I) above.

From the viewpoint of image fixation, the concentration of the radically polymerizable compound added to the undercoat liquid is, relative to the total weight of the undercoat liquid, preferably 40 to 98 wt %, more preferably 50 to 95 wt %, and yet more preferably 60 to 90 wt %. It is preferable for the amount of radically polymerizable compound added to be in the above-mentioned range since the curability is excellent and the viscosity is appropriate.

The concentration of the photopolymerization initiator added is, relative to the total weight of the undercoat liquid, preferably 0.1 to 20.0 wt %, more preferably 0.5 to 18.0 wt %, and yet more preferably 1.0 to 15.0 wt %. It is preferable for the amount of photopolymerization initiator added to be in the above-mentioned range since the curability is excellent and it is appropriate from the viewpoint of the surface tackiness being suppressed.

The concentration of the sensitizer represented by Formula (I) above contained in the undercoat liquid is, relative to the total weight of the undercoat liquid, preferably 0.1 to 15.0 wt %, more preferably 0.5 to 10.0 wt %, and yet more preferably 1.0 to 8.0 wt %. It is preferable for the amount added to be in the above-mentioned range since good internal curability can be obtained for the coating. With regard to the sensitizer, one type thereof may be used on its own or two or more types may be used in combination. When two or more types are used in combination, the total amount thereof is preferably in the above-mentioned range.

Moreover, from the viewpoint of the internal curability of a coating being enhanced, the undercoat liquid preferably comprises as the photopolymerization initiator at least one type of compound selected from the group consisting of an acylphosphine oxide compound and an α-aminoacetophenone compound. The undercoat liquid may comprise one of the acylphosphine oxide compound and the α-aminoacetophenone compound, or may comprise both.

The concentration of said at least one type of compound selected from the group consisting of an acylphosphine oxide compound and an α-aminoacetophenone compound contained in the undercoat liquid is, relative to the total weight of the undercoat liquid, preferably 0.1 to 20.0 wt %, more preferably 0.5 to 18.0 wt %, and yet more preferably 1.0 to 15.0 wt %. It is preferable for the amount added to be in the above-mentioned range since good internal curability can be obtained for the coating. When two or more types of compounds selected from the group consisting of an acylphosphine oxide compound and an α-aminoacetophenone compound are used, the total amount thereof is preferably in the above-mentioned range.

From the viewpoint of providing a uniform coating on a recording medium, it is preferable that the viscosity at 25° C. of the undercoat liquid is no greater than 1,000 mPa·s or the viscosity thereof at 60° C. is no greater than 300 mPa·s, it is more preferable that the viscosity at 25° C. is no greater than 600 mPa·s or the viscosity at 60° C. is no greater than 200 mPa·s, and it is particularly preferable that the viscosity at 25° C. is no greater than 400 mPa·s or the viscosity at 60° C. is no greater than 150 mPa·s.

Similarly, from the viewpoint of providing a uniform coating on the recording medium, the surface tension of the undercoat liquid at 25° C. is preferably at least 16 mN/m but no greater than 38 mN/m, more preferably at least 18 mN/m but no greater than 33 mN/m, and yet more preferably at least 20 mN/m but no greater than 30 mN/m.

Furthermore, from the viewpoint of enhancement of color reproduction of an image, it is preferable that the undercoat liquid comprises substantially no colorant or comprises a white pigment. The above term 'comprising substantially no colorant' does not exclude the use of a trace amount of a blue pigment in order to correct a yellow tint of a recording medium, or the presence of a very small amount of a colorant at a level that cannot be observed. The amount thereof allowed is preferably no greater than 1 wt % relative to the total weight of the undercoat liquid, and it is particularly preferable that none is contained.

The white pigment preferably used is described in the section on the colorant.

Various components used in the colored liquid and the undercoat liquid are explained below.

Sensitizer Represented by Formula (I)

In the present invention, the undercoat liquid comprises a sensitizer represented by Formula (I). Furthermore, the colored liquid also preferably comprises a sensitizer represented by Formula (I).

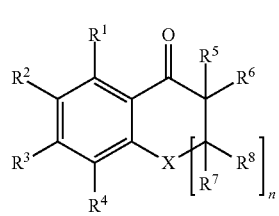

In Formula (I) above, X denotes O, S, or NR. n denotes 0 or 1. R denotes a hydrogen atom, an alkyl group, or an acyl group. $R^1$, $R^2$, $R^3$, $R^4$, $R^5$, $R^6$, $R^7$, and $R^8$ independently denote a hydrogen atom or a monovalent substituent.

In Formula (I) above, X denotes O, S, or NR, and here R denotes a hydrogen atom, an alkyl group, or an acyl group. n denotes 0 or 1.

X is preferably O or S, and more preferably S.

n denotes 0 or 1. Here, when n is 0, the carbon atom bonded to $R^7$ and $R^8$ is not present, and X, comprising a heteroatom, and the carbon atom bonded to $R^5$ and $R^6$ are directly bonded to each other, thus forming a five-membered heterocycle containing X.

$R^1$, $R^2$, $R^3$, $R^4$, $R^5$, $R^6$, $R^7$, and $R^8$ independently denote a hydrogen atom or a monovalent substituent.

When $R^1$, $R^2$, $R^3$, $R^4$, $R^5$, $R^6$, $R^7$, and $R^8$ denote a monovalent substituent, examples of the monovalent substituent include a halogen atom, an aliphatic group (e.g. an acyclic or cyclic hydrocarbon group such as an alkyl group, an alkenyl group, an alkynyl group, a cycloalkyl group, or a cycloalkenyl group), an aromatic group, a heterocyclic group, a cyano group, a hydroxy group, a nitro group, an amino group, an alkylamino group, a dialkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphonyl group, an acyl group, a carboxyl group, and a sulfo group; among them an alkoxy group, an alkyl group, and a halogen atom are preferable, and an alkyl group and a halogen atom are more preferable.

These monovalent substituents may be further substituted with the above-mentioned substituent. For example, an alkyl group may be substituted with a halogen atom to form a haloalkyl group or may be substituted with a carboxyl group to form a carboxyalkyl group.

When $R^1$, $R^2$, $R^3$, $R^4$, $R^5$, $R^6$, $R^7$, and $R^8$ in Formula (I) denote a monovalent substituent, preferred examples of the alkyl group include those having 1 to 4 carbons such as a methyl group, an ethyl group, a propyl group, an n-butyl group, a sec-butyl group, and a t-butyl group.

Similarly, preferred examples of the alkoxy group include those having 1 to 4 carbons such as a methoxy group, an ethoxy group, a hydroxyethoxy group, a propoxy group, an n-butoxy group, an isobutoxy group, a sec-butoxy group, and a t-butoxy group.

Examples of the halogen atom include a fluorine atom, a chlorine atom, a bromine atom, and an iodine atom.

Examples of sensitizers that can be suitably used include sensitizers represented by Formula (I-A) below.

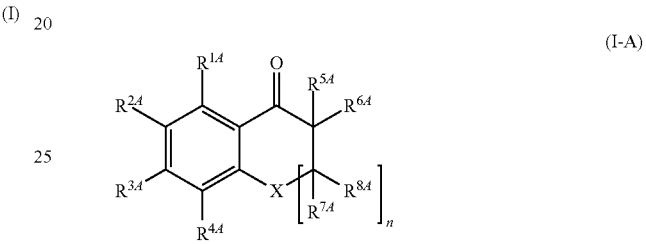

In Formula (I-A) above, X denotes O or S. n denotes 0 or 1. $R^{1A}$, $R^{2A}$, $R^{3A}$, $R^{4A}$, $R^{5A}$, $R^{6A}$, $R^{7A}$, and $R^{8A}$ independently denote a hydrogen atom, a halogen atom, an alkyl group, a hydroxy group, a cyano group, a nitro group, an amino group, an alkylamino group, a dialkylamino group, an alkylthio group, an alkoxy group, an alkoxycarbonyl group, an acyloxy group, an acyl group, a carboxyl group, or a sulfo group.

These monovalent substituents may be further substituted with the above-mentioned substituent. For example, an alkyl group may be substituted with a halogen atom to form a haloalkyl group or may be substituted with a carboxyl group to form a carboxyalkyl group.

Examples of sensitizers that can be suitably used include sensitizers represented by Formula (I-B) below.

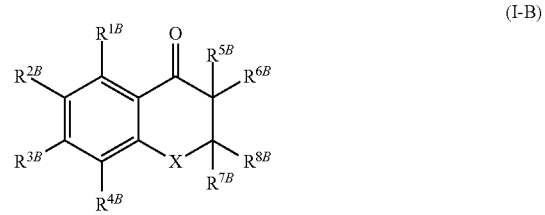

In Formula (I-B) above, X denotes O or S. $R^{1B}$, $R^{2B}$, $R^{3B}$, $R^{4B}$, $R^{5B}$, $R^{6B}$, $R^{7B}$, and $R^{8B}$ independently denote a hydrogen atom, a halogen atom, an alkyl group, a hydroxy group, a cyano group, a nitro group, an amino group, an alkylamino group, a dialkylamino group, an alkylthio group, an alkoxy group, an alkoxycarbonyl group, an acyloxy group, an acyl group, a carboxyl group, or a sulfo group.

These monovalent substituents may be further substituted with the above-mentioned substituent. For example, an alkyl group may be substituted with a halogen atom to form a haloalkyl group or may be substituted with a carboxyl group to form a carboxyalkyl group.

Examples of sensitizers that can be suitably used include sensitizers represented by Formula (I-C) below.

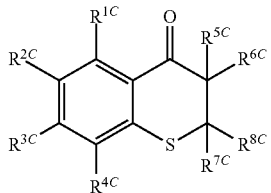 (I-C)

In Formula (I-C) above, $R^{1C}$, $R^{2C}$, $R^{3C}$, $R^{4C}$, $R^{5C}$, $R^{6C}$, $R^{7C}$, and $R^{8C}$ independently denote a hydrogen atom, a halogen atom, an alkyl group, a hydroxy group, a cyano group, a nitro group, an amino group, an alkylthio group, an alkylamino group, an alkoxy group, an alkoxycarbonyl group, an acyloxy group, an acyl group, a carboxyl group, or a sulfo group.

These monovalent substituents may be further substituted with the above-mentioned substituent. For example, an alkyl group may be substituted with a halogen atom to form a haloalkyl group or may be substituted with a carboxyl group to form a carboxyalkyl group.

Specific examples (compound examples (I-1) to (I-96)) of the sensitizer represented by Formula (I) suitably used in the present invention are listed below, but the present invention is not limited thereto. In the present invention, in some of the structural formulae a hydrocarbon chain is represented by a simplified structural formula in which symbols for carbon (C) and hydrogen (H) are omitted. Me denotes a methyl group, $Bu^t$ denotes a tert-butyl group, and $Pr^i$ denotes an isopropyl group.

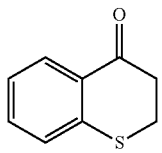 (I-1)

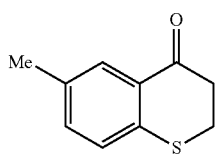 (I-2)

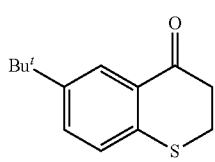 (I-3)

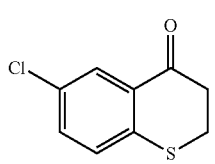 (I-4)

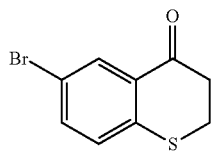 (I-5)

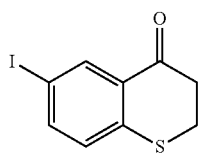 (I-6)

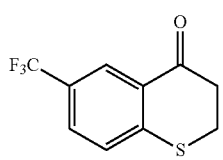 (I-7)

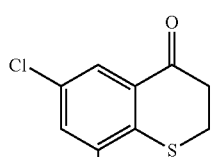 (I-8)

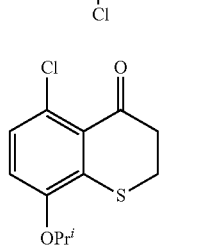 (I-9)

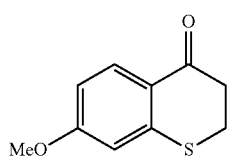 (I-10)

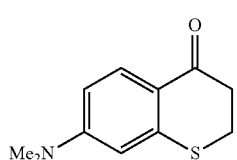 (I-11)

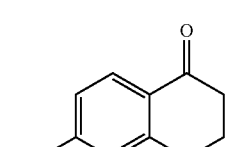 (I-12)

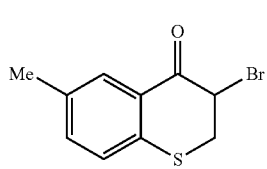 (I-13)

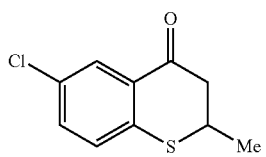 (I-14)
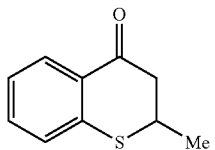 (I-15)
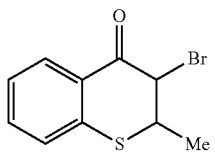 (I-16)
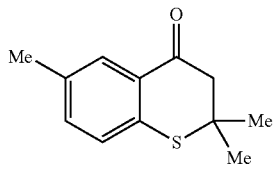 (I-17)
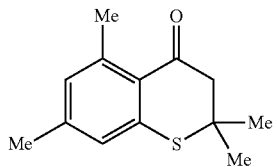 (I-18)
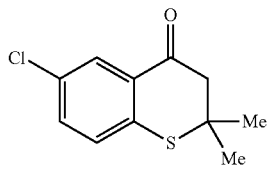 (I-19)
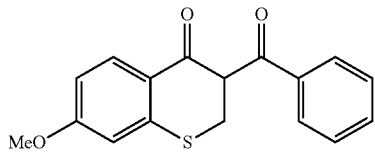 (I-20)
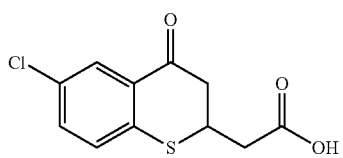 (I-21)
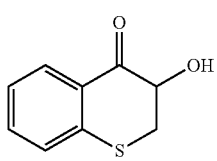 (I-22)
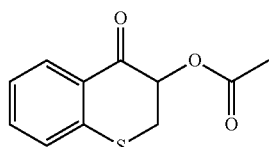 (I-23)
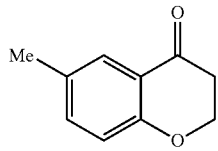 (I-24)
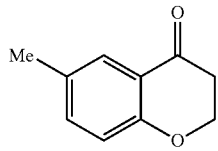 (I-25)
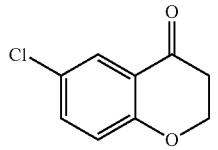 (I-26)
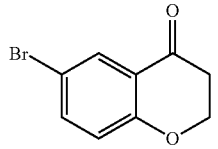 (I-27)
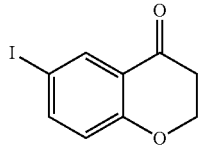 (I-28)
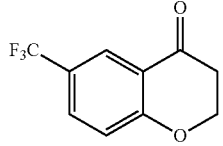 (I-29)
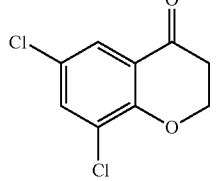 (I-30)
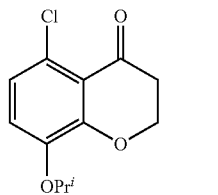 (I-31)

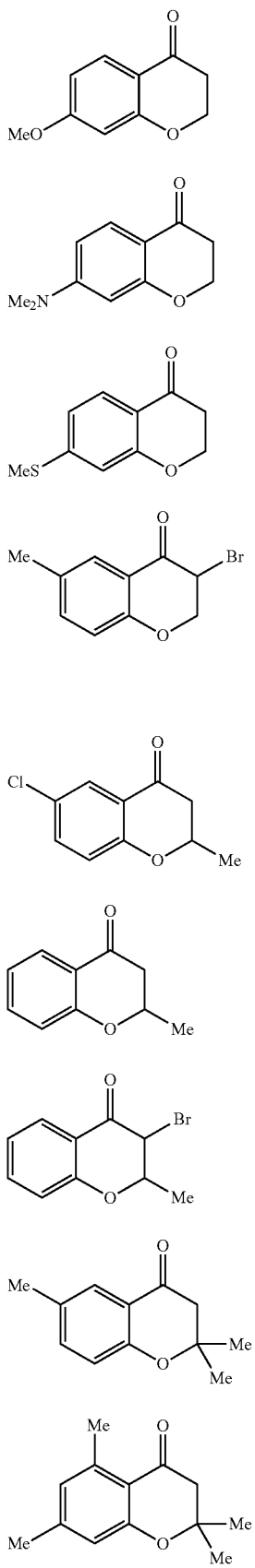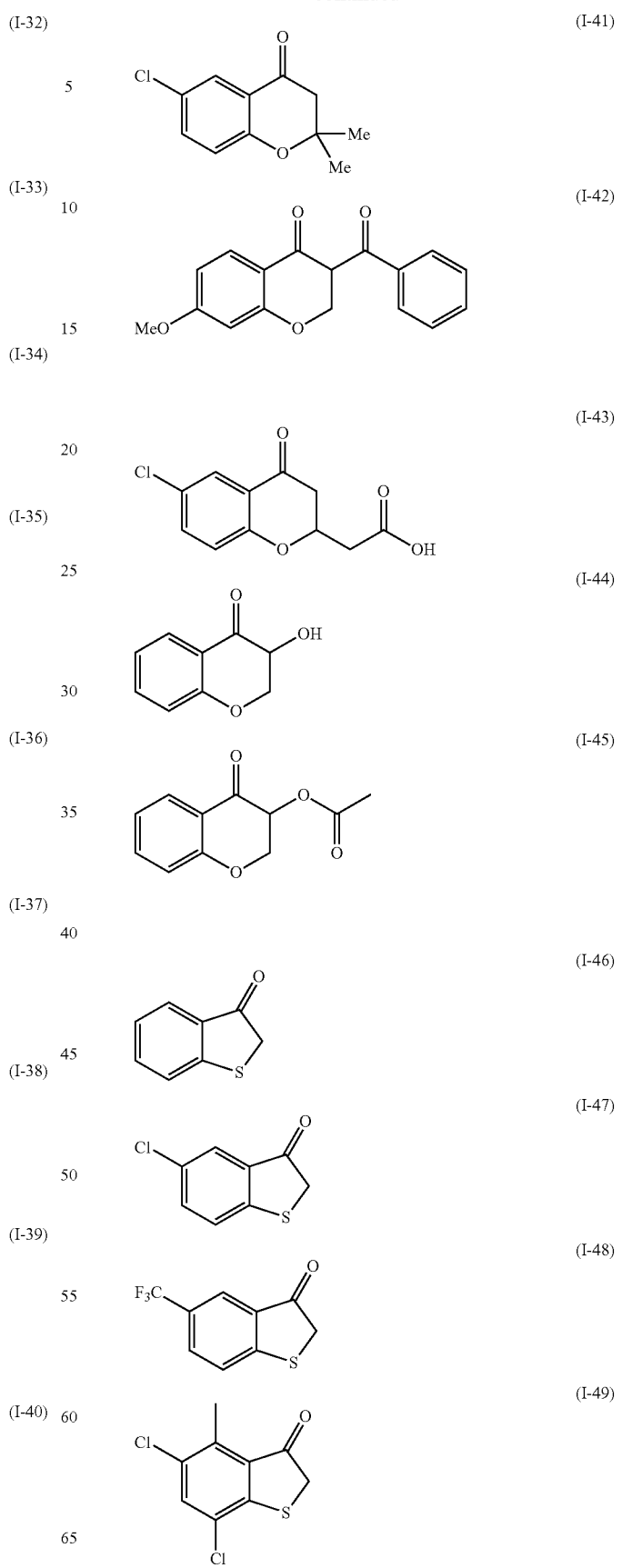

(I-50) 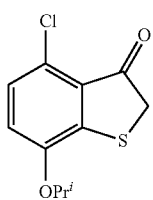
(I-51) 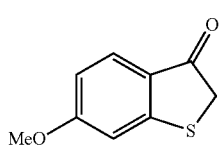
(I-52) 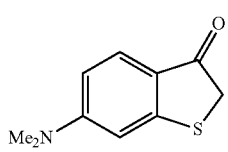
(I-53) 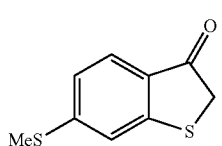
(I-54) 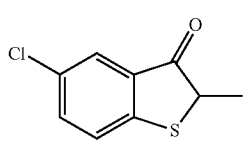
(I-55) 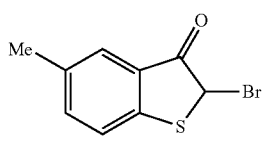
(I-56) 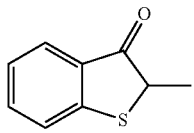
(I-57) 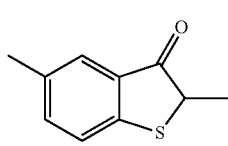
(I-58) 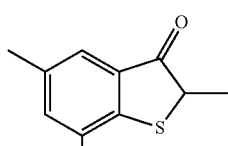
(I-59) 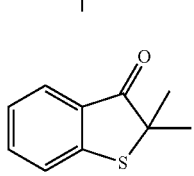
(I-60) 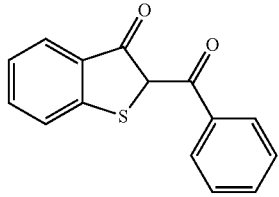
(I-61) 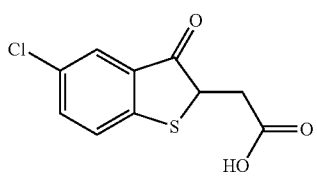
(I-62) 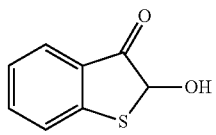
(I-63) 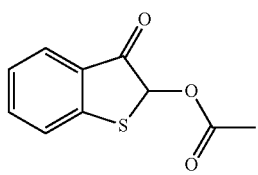
(I-64) 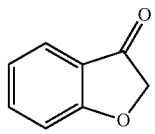
(I-65) 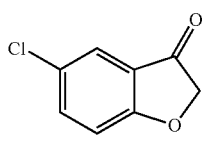
(I-66) 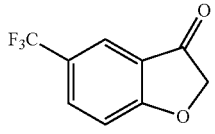
(I-67) 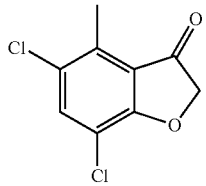
(I-68) 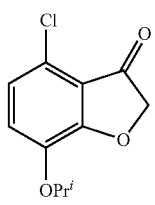

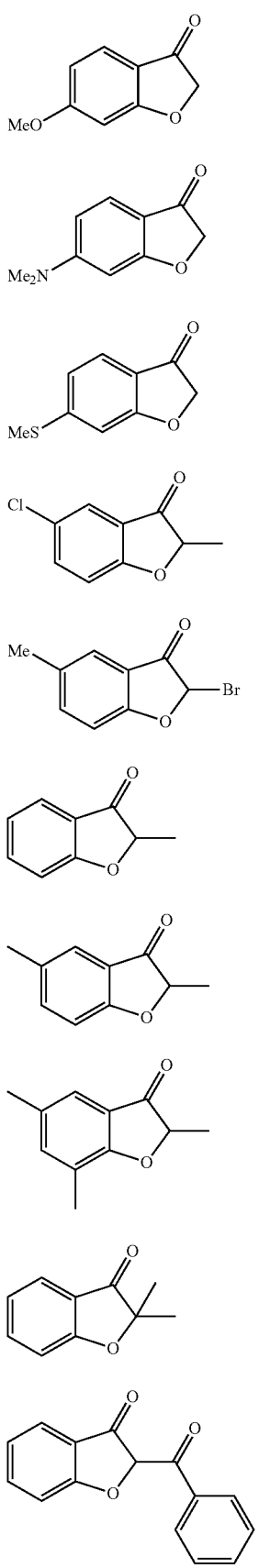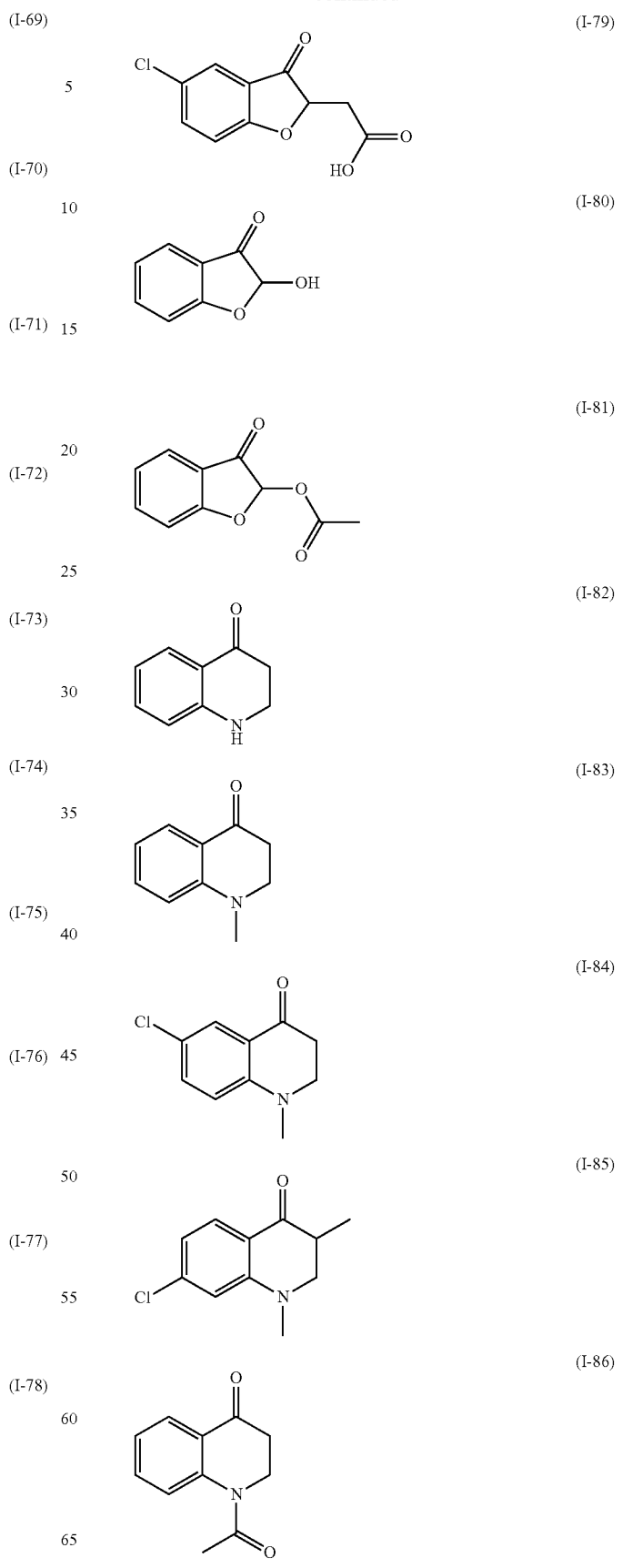

(I-87) 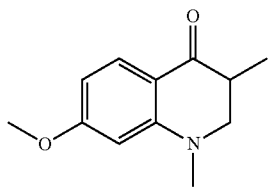

(I-88) 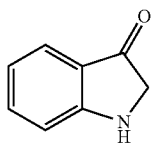

(I-89) 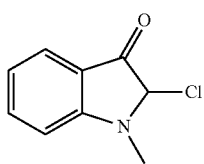

(I-90) 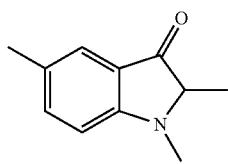

(I-91) 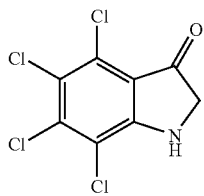

(I-92) 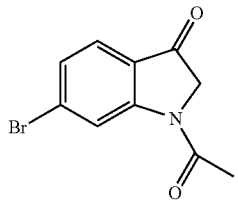

(I-93) 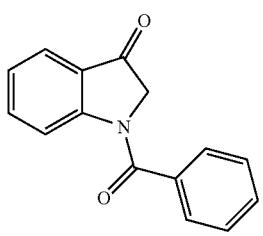

(I-94) 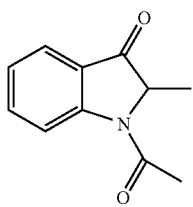

(I-95) 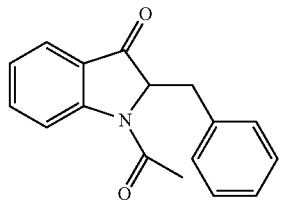

(I-96) 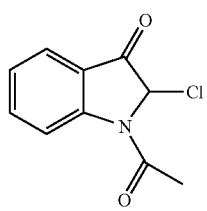

The sensitizer represented by Formula (I) above may be synthesized by a known method described in, for example, JP-A-2004-189695, Tetrahedron, Vol. 49, p. 939 et seq., 1993, Journal of Organic Chemistry, p. 893 et seq., 1945, Journal of Organic Chemistry, p. 4939 et seq., 1965, etc.

Radically Polymerizable Compound

The radically polymerizable compound used in the colored liquid and the undercoat liquid is explained.

As the radically polymerizable compound, various types of (meth)acrylate monomer are preferably used, and an acrylate monomer is more preferable.

Examples thereof include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl diglycol (meth)acrylate, 2-hydroxybutyl (meth)acrylate, 2-(meth)acryloyloxyethylhexahydrophthalic acid, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloxyethylsuccinic acid, 2-(meth)acryloxyethylphthalic acid, 2-(meth)acryloxyethyl-2-hydroxyethylphthalic acid, lactone-modified flexible (meth)acrylate, and t-butylcyclohexyl (meth)acrylate.

Furthermore, examples thereof include polyfunctional monomers such as triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethyloltricyclodecane di(meth)acrylate, the di(meth)acrylate of a bisphenol A EO (ethylene oxide) adduct, the di(meth)acrylate of a bisphenol A PO (propylene oxide) adduct, neopentyl glycol di(meth)acrylate hydroxypivalate, polytetramethylene glycol di(meth)acrylate, trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerolpropoxy tri(meth)acrylate, caprolactone-modified trimethylolpropane tri(meth)acrylate, pentaerythritolethoxy tetra(meth)acrylate, and caprolactone-modified dipentaerythritol hexa(meth)acrylate.

Here, '(meth)acrylate' is an abbreviation denoting either 'methacrylate' or 'acrylate', or both thereof.

In addition thereto, a polymerizable oligomer may be added in the same manner as for the monomer. Examples of the polymerizable oligomer include epoxy acrylate, aliphatic urethane acrylate, aromatic urethane acrylate, polyester acrylate, and a straight chain acrylic oligomer.

As the radically polymerizable compound constituting the colored liquid and the undercoat liquid, the above-mentioned radically polymerizable compound may be used as appropriate, but from the viewpoint of improvement in flexibility and scratch resistance of a cured material, the radically polymerizable compound preferably comprises a cyclic monomer and is more preferably a monomer having an alicyclic structure and one radically polymerizable group selected from the group consisting of a (meth)acryloyloxy group, a (meth)acrylamide group, a vinyl group, and a vinyl ether group (hereinafter, also called a monofunctional cyclic monomer). As the polymerizable group, a (meth)acryloyloxy group or a (meth)acrylamide group is preferable, a (meth)acryloyloxy group is more preferable, and an acryloyloxy group is particularly preferable. That is, the radically polymerizable compound preferably comprises a monofunctional cyclic acrylate compound. It is preferably any one of compounds (M-1 to M-29) below.

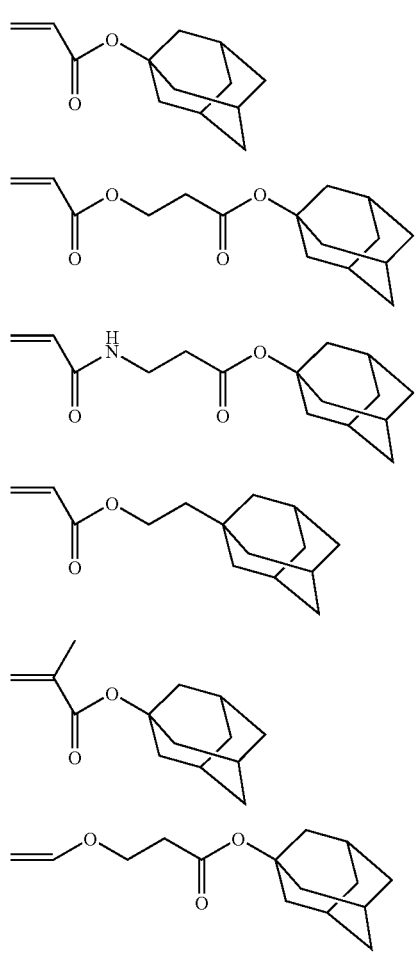
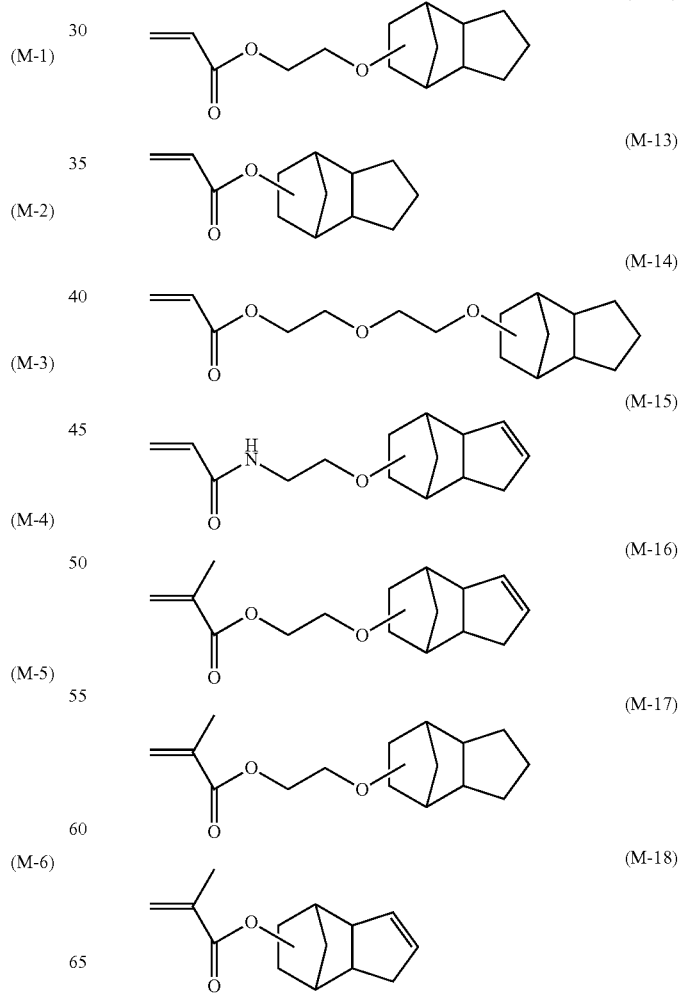

-continued (M-19) 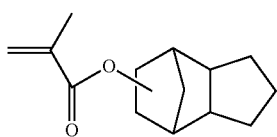

(M-20) 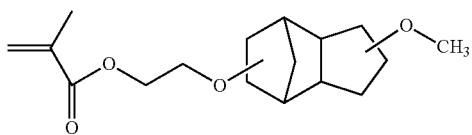

(M-21) 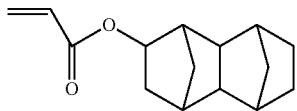

(M-22) 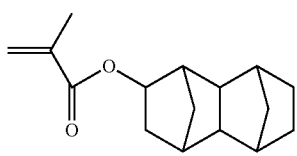

(M-23) 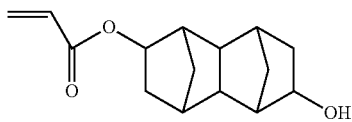

(M-24) 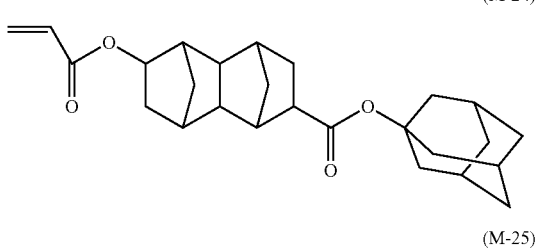

(M-25) 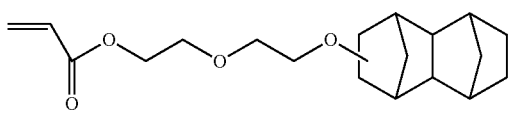

(M-26) 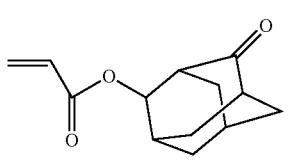

(M-27) 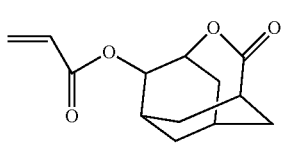

(M-28) 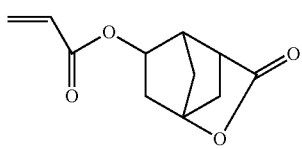

-continued (M-29) 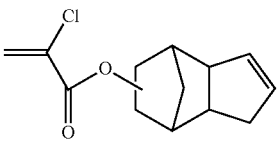

Photopolymerization Initiator

In the present invention, as the photopolymerization initiator that is contained in the colored liquid or the undercoat liquid, a known radical polymerization initiator may be used. The photopolymerization initiator that can be used in the present invention may be used on its own or in a combination of two or more types.

The photopolymerization initiator that can be used in the present invention is a compound that forms a polymerization initiating species by irradiation with actinic radiation. Examples of the actinic radiation include γ rays, β rays, an electron beam, UV rays, visible light, and IR rays, and from the viewpoint of equipment cost and operational safety, UV rays and visible light are preferable.

A photopolymerization initiator known to a person skilled in the art may be used without limitation, and many specific examples thereof are described in Bruce M. Monroe et al., Chemical Reviews, 93, 435 (1993), R. S. Davidson, Journal of Photochemistry and Biology A: Chemistry, 73, 81 (1993), J. P. Faussier "Photoinitiated Polymerization-Theory and Applications": Rapra Review, Vol. 9, Report, Rapra Technology (1998), and M. Tsunooka et al., Prog. Polym. Sci., 21, 1 (1996). Furthermore, many compounds utilized in chemically amplified photoresists and cationic photopolymerization, etc. are described in 'Imejingu yo Yukizairyou' (Organic Materials for Imaging) Ed. Japanese Research Association for Organic Electronics Materials, Bunshin Publishing Co. (1993), pp. 187-192. Moreover, a group of compounds are known, as described in F. D. Saeva, Topics in Current Chemistry, 156, 59 (1990), G. G. Maslak, Topics in Current Chemistry, 168, 1 (1993), H. B. Shuster et al., JACS, 112, 6329 (1990), I. D. F. Eaton et al., JACS, 102, 3298 (1980), etc., that cause oxidative or reductive bond cleavage via interaction with an electronic excited state of a sensitizing dye.

Moreover, as described above, from the viewpoint of enhancing the internal curability of a coating, in the present invention it is preferable to use as the photopolymerization initiator at least one type of compound selected from an acylphosphine oxide compound and an α-aminoacetophenone compound. Furthermore, in the present invention it is more preferable to use as the photopolymerization initiator at least one type of acylphosphine oxide compound and at least one type of α-aminoacetophenone compound in combination.

Preferred examples of the acylphosphine oxide compound and the α-aminoacetophenone compound are as follows.

Acylphosphine Oxide Compound

As the acylphosphine oxide compound, a compound represented by Formula (2) or Formula (3) below is preferable.

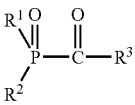

(2)

$R^1$ and $R^2$ in Formula (2) above independently denote an aliphatic group, an aromatic group, an aliphatic oxy group, an aromatic oxy group, or a heterocyclic group, and $R^3$ denotes an aliphatic group, an aromatic group, or a heterocyclic group. $R^1$ and $R^2$ above may be bonded to form a 5-membered to 9-membered ring. The ring structure may be a heterocycle having in the ring structure an oxygen atom, a nitrogen atom, a sulfur atom, etc.

Examples of the aliphatic group represented by $R^1$, $R^2$, or $R^3$ above include an alkyl group, a substituted alkyl group, an alkenyl group, a substituted alkenyl group, an alkynyl group, a substituted alkynyl group, an aralkyl group, and a substituted aralkyl group; among them, an alkyl group, a substituted alkyl group, an alkenyl group, a substituted alkenyl group, an aralkyl group, and a substituted aralkyl group are preferable, and an alkyl group and a substituted alkyl group are particularly preferable. Furthermore, the aliphatic group may be a cyclic aliphatic group or an open-chain aliphatic group. The open-chain aliphatic group may be branched.

Examples of the alkyl group include straight chain, branched, and cyclic alkyl groups, and the number of carbons in the alkyl group is preferably at least 1 but no greater than 30, and more preferably at least 1 but no greater than 20. A preferred range for the number of carbons in the alkyl moiety of the substituted alkyl group is the same as for the alkyl group above. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, an cyclopentyl group, a neopentyl group, an isopropyl group, and an isobutyl group.

Examples of the substituent of the substituted alkyl group include —COOH (carboxyl group), —SO$_3$H (sulfo group), —CN (cyano group), a halogen atom (e.g. a fluorine atom, a chlorine atom, a bromine atom), —OH (hydroxy group), an alkoxycarbonyl group having no greater than 30 carbons (e.g. a methoxycarbonyl group, an ethoxycarbonyl group, a benzyloxycarbonyl group), an alkylsulfonylaminocarbonyl group having no greater than 30 carbons, an arylsulfonylaminocarbonyl group having no greater than 30 carbons, an alkylsulfonyl group having no greater than 30 carbons, an arylsulfonyl group having no greater than 30 carbons, an acylaminosulfonyl group having no greater than 30 carbons, an alkoxy group having no greater than 30 carbons (e.g. a methoxy group, an ethoxy group, a benzyloxy group, a phenoxyethoxy group, a phenethyloxy group), an alkylthio group having no greater than 30 carbons (e.g. a methylthio group, an ethylthio group, a methylthioethylthioethyl group), an aryloxy group having no greater than 30 carbons (e.g. a phenoxy group, a p-tolyloxy group, a 1-naphthoxy group, a 2-naphthoxy group), a nitro group, an alkoxycarbonyloxy group having no greater than 30 carbons, an aryloxycarbonyloxy group having no greater than 30 carbons, an acyloxy group having no greater than 30 carbons (e.g. an acetyloxy group, a propionyloxy group), an acyl group having no greater than 30 carbons (e.g. an acetyl group, a propionyl group, a benzoyl group), a carbamoyl group (e.g. a carbamoyl group, an N,N-dimethylcarbamoyl group, a morpholinocarbonyl group, a piperidinocarbonyl group), a sulfamoyl group (e.g. a sulfamoyl group, an N,N-dimethylsulfamoyl group, a morpholinosulfonyl group, a piperidinosulfonyl group), an aryl group having no greater than 30 carbons (e.g. a phenyl group, a 4-chlorophenyl group, a 4-methylphenyl group, an α-naphthyl group), a substituted amino group (e.g. an amino group, an alkylamino group, a dialkylamino group, an arylamino group, a diarylamino group, an acylamino group), a substituted ureido group, a substituted phosphono group, and a heterocyclic group. Here, the carboxyl group, the sulfo group, the hydroxy group, and the phosphono group may be in the form of a salt. In this case, a cation forming the salt is a group that can form a positive ion, and is preferably an organic cationic compound, a transition metal coordination complex cation (a compound described in Japanese registered patent No. 2791143, etc.), or a metal cation (e.g. Na$^+$, K$^+$, Li$^+$, Ag$^+$, Fe$^{2+}$, Fe$^{3+}$, Cu$^+$, Cu$^{2+}$, Zn$^{2+}$, Al$^{3+}$).

Examples of the alkenyl group include straight chain, branched, and cyclic alkenyl groups, and the number of carbons of the alkenyl group is preferably at least 2 but no greater than 30, and more preferably at least 2 but no greater than 20. Furthermore, the alkenyl group may be an unsubstituted alkenyl group or a substituted alkenyl group having a substituent, and a preferred range for the number of carbons in the alkenyl moiety of the substituted alkenyl group is the same as for the alkenyl group above. Examples of the substituent of the substituted alkenyl group include the same substituents as for the above substituted alkyl group.

Examples of the alkynyl group include straight chain, branched, and cyclic alkynyl groups, and the number of carbons of the alkynyl group is preferably at least 2 but no greater than 30, and more preferably at least 2 but no greater than 20. Furthermore, the alkynyl group may be an unsubstituted alkynyl group or a substituted alkynyl group having a substituent, and a preferred range for the number of carbons in the alkynyl moiety of the substituted alkynyl group is the same as for the alkynyl group above. Examples of the substituent of the substituted alkynyl group include the same substituents as for the above substituted alkyl group.

Examples of the aralkyl group include aralkyl groups having a straight chain, branched, or cyclic alkyl side chain; the number of carbons of the aralkyl group is preferably at least 7 but no greater than 35, and more preferably at least 7 but no greater than 25. Furthermore, the aralkyl group may be an unsubstituted aralkyl group or a substituted aralkyl group having a substituent, and a preferred range for the number of carbons in the aralkyl moiety of the substituted aralkyl group is the same as for the aralkyl group above. Examples of the substituent of the substituted aralkyl group include the same substituents as for the above substituted alkyl group. Furthermore, the aryl moiety of the aralkyl group may have a substituent, and examples of the substituent include the same substituents as for the substituted alkyl group above and straight chain, branched, and cyclic alkyl groups having no greater than 30 carbons.

Examples of the aromatic group represented by $R^1$, $R^2$, or $R^3$ include an aryl group and a substituted aryl group. The number of carbons of the aryl group is preferably at least 6 but no greater than 30, and more preferably at least 6 but no greater than 20. A preferred range for the number of carbons in the aryl moiety of the substituted aryl group is the same as for the aryl group above. Examples of the aryl group include a phenyl group, an α-naphthyl group, and a β-naphthyl group. Examples of the substituent of the substituted aryl group include the same substituents as for the above substituted alkyl group, and straight chain, branched, and cyclic alkyl groups having no greater than 30 carbons.

The aliphatic oxy group represented by $R^1$ or $R^2$ above is preferably an alkoxy group having at least 1 but no greater than 30 carbons, and examples thereof include a methoxy group, an ethoxy group, a butoxy group, an octyloxy group, and a phenoxyethoxy group. However, the examples are not limited thereto.

The aromatic oxy group represented by $R^1$ or $R^2$ above is preferably an aryloxy group having at least 6 but no greater than 30 carbons, and examples thereof include a phenoxy group, a methylphenyloxy group, a chlorophenyloxy group, a methoxyphenyloxy group, and an octyloxyphenyloxy group. However, the examples are not limited thereto.

The heterocyclic group represented by $R^1$, $R^2$, or $R^3$ above is preferably an N, O, or S atom-containing heterocyclic group, and examples thereof include a pyridyl group, a furyl group, a thienyl group, an imidazolyl group, and a pyrrolyl group.

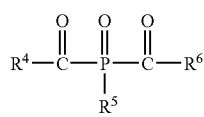
(3)

$R^4$ and $R^6$ in Formula (3) above independently denote an alkyl group, an aryl group, or a heterocyclic group, and $R^5$ denotes an alkyl group, an aryl group, an alkoxy group, an aryloxy group, or a heterocyclic group.

The alkyl group, aryl group, heterocyclic group, alkoxy group, and aryloxy group denoted by $R^4$, $R^5$, or $R^6$ may have a substituent, and examples of the substituent include the same substituents as in the case of Formula (2) above.

The alkyl group, aryl group, heterocyclic group, alkoxy group, and aryloxy group in Formula (3) above are the same as those in Formula (2) above.

The compound represented by Formula (2) above is preferably a compound represented by Formula (4) below.

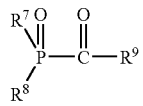
(4)

In Formula (4), $R^7$ and $R^8$ independently denote a phenyl group, a methoxy group, or an isopropoxy group, and $R^9$ denotes a 2,4,6-trimethylphenyl group, a 2,4-dimethylphenyl group, a 2-methylphenyl group (o-toluoyl group), an isobutyl group, or a t-butyl group.

The compound represented by Formula (3) above is preferably a compound represented by Formula (5) below.

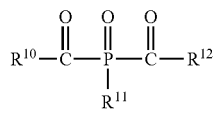
(5)

In Formula (5), $R^{10}$ and $R^{12}$ independently denote a 2,4,6-trimethylphenyl group, a 2,6-dimethylphenyl group, or a 2,6-dimethoxyphenyl group, and $R^{11}$ denotes a phenyl group or a 2,4,4-trimethylpentyl group.

Examples of the acylphosphine oxide compound represented by Formula (2) or (3) above include compounds described in JP-B-63-40799 (JP-B denotes a Japanese examined patent application publication), JP-B-5-29234, JP-A-10-95788, JP-A-10-29997, etc.

Specific examples of the acylphosphine oxide compound include the compounds shown below (compound examples (P-1) to (P-26)), but the present invention is not limited thereto.

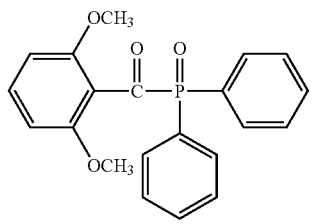
(P-1)

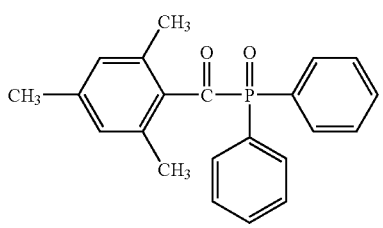
(P-2)

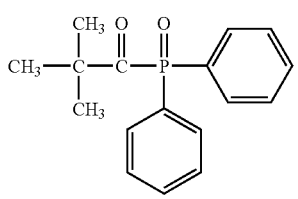
(P-3)

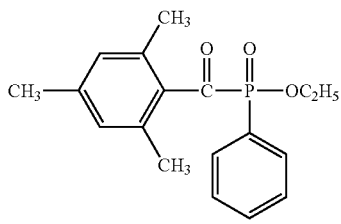
(P-4)

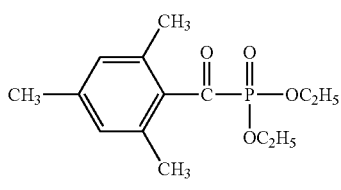
(P-5)

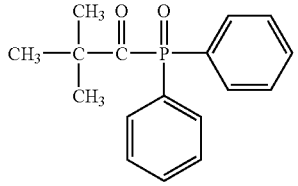
(P-6)

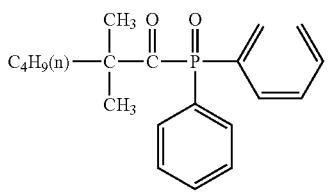
(P-7)

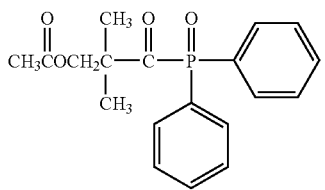
(P-8)

(P-9) 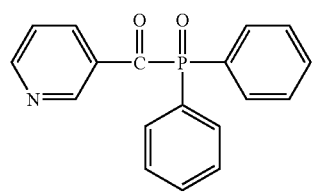
(P-10) 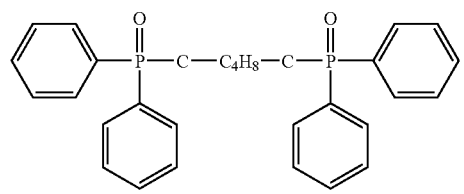
(P-11) 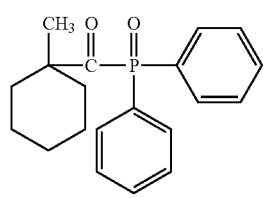
(P-12) 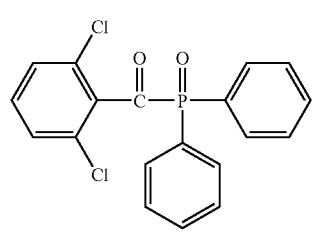
(P-13) 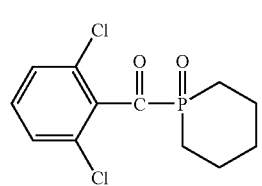
(P-14) 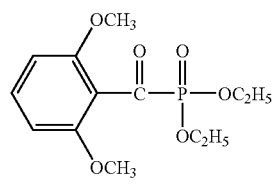
(P-15) 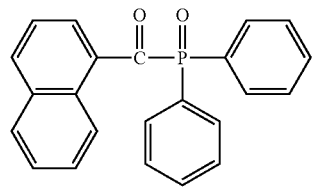
(P-16) 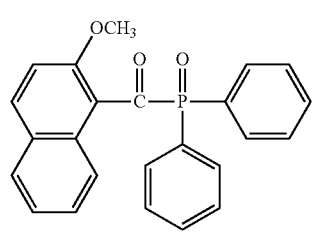
(P-17) 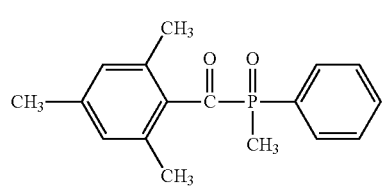
(P-18) 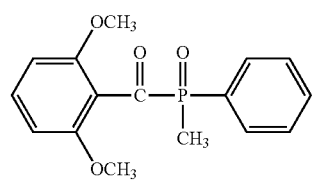
(P-19) 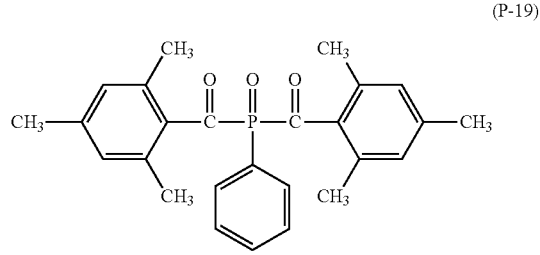
(P-20) 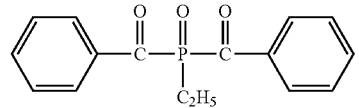
(P-21) 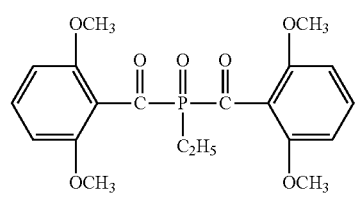
(P-22) 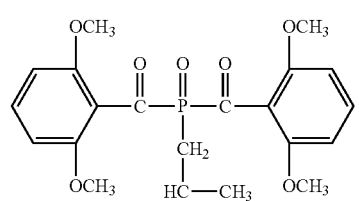
(P-23) 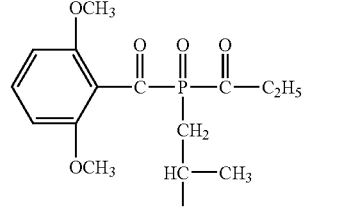

(P-24)

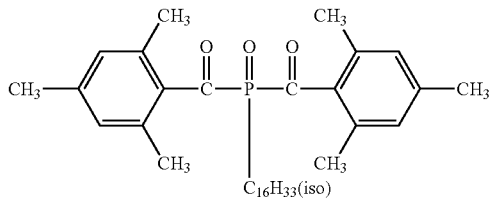

(P-25)

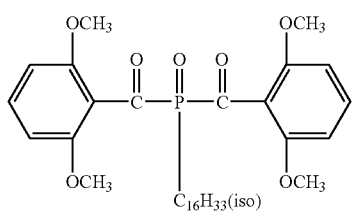

(P-26)

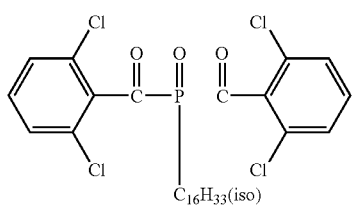

As the acylphosphine oxide compound, a monoacylphosphine oxide compound, a bisacylphosphine oxide compound, etc. may be used, and as the monoacylphosphine oxide compound a known monoacylphosphine oxide compound may be used. Examples thereof include monoacylphosphine oxide compounds described in JP-B-60-8047 and JP-B-63-40799. Specific examples thereof include bis(2,4,6-trimethylbenzoyl)phenylphosphine oxide, 2,4,6-trimethylbenzoyldiphenylphosphine oxide, methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluylphenylphosphinate, methyl o-toluylphenylphosphinate, methyl 2,4-dimethylbenzoylphenylphosphinate, isopropyl p-tert-butylbenzoylphenylphosphinate, methyl acryloylphenylphosphinate, isobutyryldiphenylphosphine oxide, 2-ethylhexanoyldiphenylphosphine oxide, o-toluoyldiphenylphosphine oxide, p-tert-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoylbis(diphenylphosphine oxide), pivaloyldiphenylphosphine oxide, p-toluoyldiphenylphosphine oxide, 4-(tert-butyl)benzoyldiphenylphosphine oxide, 2-methylbenzoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphenylphosphine oxide.

Among them, as the acylphosphine oxide compound in the present invention, bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, 2,4,6-trimethylbenzoyldiphenylphosphine oxide (DAROCUR TPO: manufactured by Ciba Specialty Chemicals, LUCIRIN TPO: manufactured by BASF), etc. are preferable.

α-Aminoacetophenone Compound

One type of α-aminoacetophenone compound may be used on its own or two or more types thereof may be used.

As the α-aminoacetophenone compound, a compound represented by Formula (1) below may preferably be used.

(1)

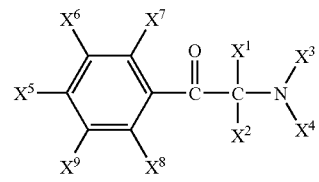

In the formula, $X^1$ denotes a group represented by (a), (b), or (c) below.

(a)

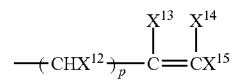

In the formula, p is 0 or 1.

(b)

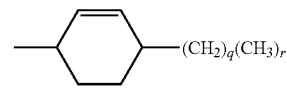

In the formula, q is an integer of 0 to 3 and r is 0 or 1.

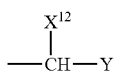

(c)

In the formula, Y denotes a hydrogen atom, a halogen atom, an OH group, an alkyl group having at least 1 but no greater than 12 carbons (unless otherwise specified, the alkyl group means a straight chain or branched alkyl group, the same applies below), an alkoxy group having at least 1 but no greater than 12 carbons, an aromatic group, or a heterocyclic group. Preferred examples of the aromatic group include a phenyl group and a naphthyl group. Preferred examples of the heterocyclic group include a furyl group, a thienyl group, and a pyridyl group.

The alkyl group, alkoxy group, aromatic group, and heterocyclic group denoted by Y may have a substituent.

Examples of the substituent that the alkyl group denoted by Y may have include an OH group, a halogen atom, $—N(X^{10})_2$ ($X^{10}$ denotes a hydrogen atom, an alkyl group having at least 1 but no greater than 8 carbons, an alkenyl group having at least 3 but no greater than 5 carbons, a phenylalkyl group having at least 7 but no greater than 9 carbons, a hydroxyalkyl group having at least 1 but no greater than 4 carbons, or a phenyl group, and the two $X^{10}$s may be identical to or different from each other), an alkoxy group having at least 1 but no greater than 12 carbons, —COOR (R denotes an alkyl group having at least 1 but no greater than 18 carbons), —CO$(OCH_2OCH_2)_nOCH_3$ (n denotes an integer of at least 1 but no greater than 20), and —OCOR (R denotes an alkyl group having at least 1 but no greater than 4 carbons).

Examples of the substituent that the alkoxy group denoted by Y may have include —COOR (R denotes an alkyl group having at least 1 but no greater than 18 carbons) and —CO$(OCH_2CH_2)_nOCH_3$ (n denotes an integer of at least 1 but no greater than 20).

Examples of the substituent that the aromatic group or heterocyclic group denoted by Y may have include $—(OCH_2CH_2)_nOH$ (n denotes an integer of at least 1 but no greater than 20), $—(OCH_2CH_2)_nOCH_3$ (n denotes an integer of at least 1 but no greater than 20), an alkylthio group having at least 1 but no greater than 8 carbons, a phenoxy group, —COOR (R denotes an alkyl group having at least 1 but no greater than 18 carbons), $—CO(OCH_2CH_2)_nOCH_3$ (n denotes an integer of at least 1 but no greater than 20), a phenyl group, and a benzyl group.

Two or more such substituents may be present if this is possible, and the substituent may further be substituted if this is possible.

Furthermore, in the formula, $X^{12}$ denotes a hydrogen atom, an alkyl group having at least 1 but no greater than 8 carbons, or a phenyl group. $X^{13}$, $X^{14}$, and $X^{15}$ independently denote a hydrogen atom or an alkyl group having at least 1 but no greater than 4 carbons. $X^{13}$ and $X^{14}$ may be bridged to form an alkylene group having at least 3 but no greater than 7 carbons.

In the formula, $X^2$ denotes the same group as for $X^1$ above, a cycloalkyl group having 5 or 6 carbons, an alkyl group having at least 1 but no greater than 12 carbons, or a phenyl group.

The alkyl group and phenyl group denoted by $X^2$ may have a substituent.

Examples of the substituent that the alkyl group denoted by $X^2$ may include an alkoxy group having at least 1 but no greater than 4 carbons, a phenoxy group, a halogen atom, and a phenyl group.

Examples of the substituent that the phenyl group denoted by $X^2$ may have include a halogen atom, an alkyl group having at least 1 but no greater than 12 carbons, and an alkoxy group having at least 1 but no greater than 4 carbons.

Two or more such substituents may be present if this is possible, and the substituent may further be substituted if this is possible.

Furthermore, in the formula, $X^1$ and $X^2$ may be bridged to form a group represented by the formulae below.

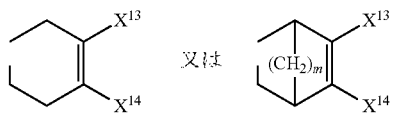

In the formula, $X^3$ denotes a hydrogen atom, an alkyl group having at least 1 but no greater than 12 carbons, an alkenyl group having at least 3 but no greater than 5 carbons, a cycloalkyl group having at least 5 but no greater than 12 carbons, or a phenylalkyl group having at least 7 but no greater than 9 carbons.

The alkyl group, alkenyl group, cycloalkyl group, and phenylalkyl group denoted by $X^3$ may have a substituent, and examples of the substituent include an OH group, an alkoxy group having at least 1 but no greater than 4 carbons, —CN, and —COOR (R denotes an alkyl group having at least 1 but no greater than 4 carbons).

In the formula, $X^4$ denotes an alkyl group having at least 1 but no greater than 12 carbons, an alkenyl group having at least 3 but no greater than 5 carbons, a cycloalkyl group having at least 5 but no greater than 12 carbons, a phenylalkyl group having at least 7 but no greater than 9 carbons, or a phenyl group.

The alkyl group, alkenyl group, cycloalkyl group, phenylalkyl group, and phenyl group denoted by $X^4$ may have a substituent.

Examples of the substituent that the alkyl group, alkenyl group, cycloalkyl group, and phenylalkyl group denoted by $X^4$ may have include an OH group, an alkoxy group having at least 1 but no greater than 4 carbons, —CN, and —COOR (R denotes an alkyl group having at least 1 but no greater than 4 carbons). When the alkyl group denoted by $X^4$ has a substituent, the number of carbons in the alkyl group that is substituted is preferably at least 2 but no greater than 4.

Examples of the substituent that the phenyl group denoted by $X^4$ may have include a halogen atom, an alkyl group having at least 1 but no greater than 12 carbons, an alkoxy group having at least 1 but no greater than 4 carbons, and —COOR (R denotes an alkyl group having at least 1 but no greater than 4 carbons).

Here, $X^2$ and $X^4$ may be bridged to form an alkylene group having at least 1 but no greater than 7 carbons, a phenylalkylene group having at least 7 but no greater than 10 carbons, an o-xylylene group, a 2-butenylene group, or an oxa- or aza-alkylene group having 2 or 3 carbons.

Furthermore, $X^3$ and $X^4$ may be bridged to form an alkylene group having at least 3 but no greater than 7 carbons.

The alkylene group formed by bridging $X^3$ and $X^4$ may have as a substituent an OH group, an alkoxy group having at least 1 but no greater than 4 carbons, or —COOR (R denotes alkyl having at least 1 but no greater than 4 carbons), or may contain in a bond —O—, —S—, —CO—, or $—N(X^{16})—$ ($X^{16}$ denotes a hydrogen atom, an alkyl group having at least 1 but no greater than 12 carbons, or an alkyl group having at least 1 but no greater than 12 carbons and containing in a bonding chain one or more —O—, an alkenyl group having at least 3 but no greater than 5 carbons, a phenylalkyl group having at least 7 but no greater than 9 carbons, a hydroxyalkyl group having at least 1 but no greater than 4 carbons, —CH$_2$CH$_2$CN, —CH$_2$CH$_2$COOR(R denotes an alkyl group having at least 1 but no greater than 4 carbons), an alkanoyl group having at least 2 but no greater than 8 carbons, or a benzoyl group).

In the formula, $X^5$, $X^6$, $X^7$, $X^8$, and $X^9$ independently denote a hydrogen atom, a halogen atom, an alkyl group having at least 1 but no greater than 12 carbons, a cycloalkyl group having 5 or 6 carbons, a phenyl group, a benzyl group, a benzoyl group, an —OX$^{17}$ group, an —SX$^{18}$ group, an —SO—X$^{18}$ group, an —SO$_2$—X$^{18}$ group, an —N(X$^{19}$)(X$^{20}$) group, an —NH—SO$_2$—X$^{21}$ group, or a group represented by the formula below.

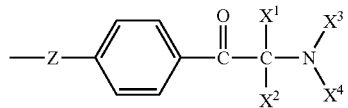

In the formula, Z denotes —O—, —S—, —N(X$^{10}$)— X$^{11}$—N(X$^{10}$)—, or a group represented by the formula below. $X^1$, $X^2$, $X^3$, and $X^4$ have the same meanings as defined for Formula (1).

In the formula, $X^{10}$ is the same as described above, and $X^{11}$ denotes a straight chain or branched alkylene group having at least 2 but no greater than 16 carbons, or a straight chain or branched alkylene group having at least 2 but no greater than 16 carbons in which at least one —O—, —S—, or —N(X$^{10}$)— is present in the chain ($X^{10}$ is the same as above).

$X^{17}$ denotes a hydrogen atom, an alkyl group having at least 1 but no greater than 12 carbons, —(CH$_2$CH$_2$O)$_n$H (n is an integer of at least 2 but no greater than 20), an alkanoyl group having at least 2 but no greater than 8 carbons, an alkenyl group having at least 3 but no greater than 12 carbons, a cyclohexyl group, a hydroxycyclohexyl group, a phenyl group, a phenylalkyl group having at least 7 but no greater than 9 carbons, or —Si(R$^4$)$_r$(R$^5$)$_{3-r}$ (R$^4$ is an alkyl group having at least 1 but no greater than 8 carbons, R$^5$ is a phenyl group, and r is 1, 2, or 3).

The alkyl group and phenyl group denoted by $X^{17}$ may have a substituent.

Examples of the substituent that the alkyl group denoted by $X^{17}$ may have include —CN, —OH, an alkoxy group having at least 1 but no greater than 4 carbons, an alkenyloxy group having at least 3 but no greater than 6 carbons, —OCH$_2$CH$_2$CN, —CH$_2$CH$_2$COOR(R denotes an alkyl group having at least 1 but no greater than 4 carbons), —COOH, or —COOR (R denotes an alkyl group having at least 1 but no greater than 4 carbons). Furthermore, when the alkyl group denoted by $X^{17}$ has a substituent, the number of carbons of the alkyl group that is substituted is preferably at least 1 but no greater than 6.

Examples of the substituent that the phenyl group denoted by $X^{17}$ may have include a halogen atom, an alkyl group having at least 1 but no greater than 12 carbons, or an alkoxy group having at least 1 but no greater than 4 carbons.

$X^{18}$ denotes a hydrogen atom, an alkyl group having at least 1 but no greater than 12 carbons, an alkenyl group having at least 3 but no greater than 12 carbons, a cyclohexyl group, a phenyl group, or a phenylalkyl group having at least 7 but no greater than 9 carbons.

The alkyl group and phenyl group denoted by $X^{18}$ may have a substituent.

Examples of the substituent that the alkyl group denoted by $X^{18}$ may have include —SH, —OH, —CN, —COOR (R denotes an alkyl group having at least 1 but no greater than 4 carbons), an alkoxy group having at least 1 but no greater than 4 carbons, —OCH$_2$CH$_2$CN, or —OCH$_2$CH$_2$COOR(R denotes alkyl having at least 1 but no greater than 4 carbons).

Examples of the substituent that the phenyl group denoted by $X^{18}$ may have include a halogen atom, an alkyl group having at least 1 but no greater than 12 carbons, or an alkoxy group having at least 1 but no greater than 4 carbons.

$X^{19}$ and $X^{20}$ independently denote a hydrogen atom; an alkyl group having at least 1 but no greater than 12 carbons; a hydroxyalkyl group having at least 2 but no greater than 4 carbons; an alkoxyalkyl group having at least 2 but no greater than 10 carbons; an alkenyl group having at least 3 but no greater than 5 carbons; a cycloalkyl group having at least 5 but no greater than 12 carbons; a phenylalkyl group having at least 7 but no greater than 9 carbons; a phenyl group; a phenyl group substituted with a halogen atom, an alkyl group having at least 1 but no greater than 12 carbons, or an alkoxy group having at least 1 but no greater than 4 carbons; an alkanoyl group having 2 or 3 carbons; or a benzoyl group. Furthermore, $X^{19}$ and $X^{20}$ may be bridged to form an alkylene group having at least 2 but no greater than 8 carbons, an alkylene group having at least 2 but no greater than 8 carbons that is substituted with an OH group, an alkoxy group having at least 1 but no greater than 4 carbons, or a —COOR (R is alkyl group having at least 1 but no greater than 4 carbons); or an alkylene group having at least 2 but no greater than 8 carbons that contains in the bonding chain —O—, —S—, or —N(X$^{16}$)— (X$^{16}$ is the same as above).

$X^{21}$ denotes an alkyl group having at least 1 but no greater than 18 carbons; a phenyl group; a naphthyl group; or a phenyl group or naphthyl group substituted with a halogen atom, an alkyl group having at least 1 but no greater than 12 carbons, or an alkoxy group having at least 1 but no greater than 8 carbons.

Formula (1) is preferably represented by Formula (d).

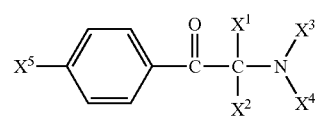

(d)

In Formula (d), $X^1$ and $X^2$ independently denote a methyl group, an ethyl group, or a benzyl group, —NX$^3$X$^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group. The benzyl group may be substituted with an alkyl group having at least 1 but no greater than 4 carbons.

Among them, it is preferable that $X^1$ and $X^2$ independently denote a methyl group, an ethyl group, or a benzyl group that may be substituted with an alkyl group having at least 1 but no greater than 4 carbons, —NX³X⁴ is a dimethylamino group or a morpholino group, and X⁵ is an alkylthio group having 1 to 4 carbons or a morpholino group.

Furthermore, as the α-aminoacetophenone compound, an acid adduct salt of the compound represented by Formula (1) above may be used.

Moreover, examples of commercial α-aminoacetophenone compounds include polymerization initiators available under the product names IRGACURE 907, IRGACURE 369, and IRGACURE 379 from Ciba Specialty Chemicals, and they may be used suitably.

Specific examples of the α-aminoacetophenone compound include the compounds below.

That is, there are 2-dimethylamino-2-methyl-1-phenylpropan-1-one, 2-diethylamino-2-methyl-1-phenylpropan-1-one, 2-methyl-2-morpholino-1-phenylpropan-1-one, 2-dimethylamino-2-methyl-1-(4-methylphenyl)propan-1-one, 2-dimethylamino-1-(4-ethylphenyl)-2-methylpropan-1-one, 2-dimethylamino-1-(4-isopropylphenyl)-2-methylpropan-1-one, 1-(4-butylphenyl)-2-dimethylamino-2-methylpropan-1-one, 2-dimethylamino-1-(4-methoxyphenyl)-2-methylpropan-1-one, 2-dimethylamino-2-methyl-1-(4-methylthiophenyl)propan-1-one, 2-methyl-1-(4-methylthiophenyl)-2-morpholinopropan-1-one (IRGACURE 907), 2-benzyl-2-dimethylamino-1-(4-morpholinophenyl)butan-1-one (IRGACURE 369), 2-benzyl-2-dimethylamino-1-(4-dimethylaminophenyl)butan-1-one, and 2-dimethylamino-2-[(4-methylphenyl)methyl]-1-[4-(4-morpholinyl)phenyl]-1-butan one (IRGACURE 379).

Other Polymerization Initiators

The colored liquid and the undercoat liquid may each comprise another photopolymerization initiator. The polymerization initiator preferably comprises a radical polymerization initiator. Examples of the other photopolymerization initiators include an α-hydroxyacetophenone compound and an oxime ester compoundand.

α-Hydroxyacetophenone Compound

The α-hydroxyacetophenone compound is preferably a compound represented by Formula (6) below.

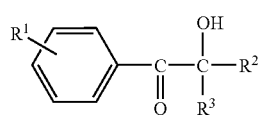

(6)

In Formula (6), $R^1$ denotes a hydrogen atom, an alkyl group having at least 1 but no greater than 10 carbons, or an alkoxy group having at least 1 but no greater than 10 carbons. $R^2$ and $R^3$ independently denote a hydrogen atom or an alkyl group having at least 1 but no greater than 10 carbons. Furthermore, $R^2$ and $R^3$ may be bonded to form a ring having at least 4 but no greater than 8 carbons.

The alkyl group, the alkoxy group, and the ring having at least 4 but no greater than 8 carbons may have a substituent, and examples of the substituent include substituents cited for Formula (2).

Examples of the α-hydroxyacetophenone include 2-hydroxy-2-methyl-1-phenylpropan-1-one (DAROCUR 1173), 2-hydroxy-2-methyl-1-phenylbutan-1-one, 1-(4-methylphenyl)-2-hydroxy-2-methylpropan-1-one, 1-(4-isopropylphenyl)-2-methylpropan-1-one, 1-(4-butylphenyl)-2-hydroxy-2-methylpropan-1-one, 2-hydroxy-2-methyl-1-(4-octylphenyl)propan-1-one, 1-(4-dodecylphenyl)-2-methylpropan-1-one, 1-(4-methoxyphenyl)-2-methylpropan-1-one, 1-(4-methylthiophenyl)-2-methylpropan-1-one, 1-(4-chlorophenyl)-2-hydroxy-2-methylpropan-1-one, 1-(4-bromophenyl)-2-hydroxy-2-methylpropan-1-one, 2-hydroxy-1-(4-hydroxyphenyl)-2-methylpropan-1-one, 1-(4-dimethylaminophenyl)-2-hydroxy-2-methylpropan-1-one, 1-(4-carboethoxyphenyl)-2-hydroxy-2-methylpropan-1-one, 1-hydroxycyclohexyl phenyl ketone (IRGACURE 184), and 1-[4-(2-hydroxyethoxy)phenyl]-2-hydroxy-2-methyl-1-propan-1-one (IRGACURE 2959).

Furthermore, as commercial α-hydroxyacetophenone compounds, polymerization initiators available under the product names IRGACURE 184, DAROCUR 1173, IRGACURE 127, and IRGACURE 2959 from Ciba Specialty Chemicals may be used.

Oxime Ester Compound

As the oxime ester compound, a compound represented by Formula (7) below is preferable.

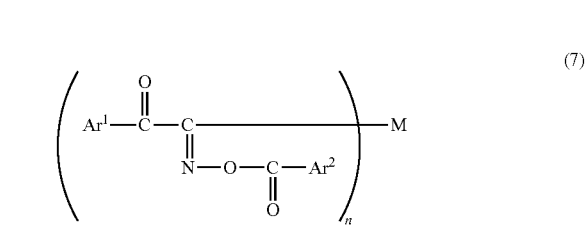

(7)

In the formula, $Ar^1$ denotes a structure selected from the group consisting of a naphthalene structure, an anthracene structure, an anthraquinone structure, a benzophenone structure, a thianthrene structure, a phenoxathiane structure, a diphenylthioether structure, a thioxanthone structure, and a morpholinobenzene structure. Among them, the naphthalene structure, the anthraquinone structure, the benzophenone structure, the diphenylthioether structure, the thioxanthone structure, and the morpholinobenzene structures are preferable, and the thioxanthone structure is particularly preferable. $Ar^2$ denotes a phenyl group. These structures or group may have a substituent such as an alkyl group such as a methyl group or an ethyl group, a halogen atom, or —CN (cyano group).

n denotes an integer of 1 or 2. When n is 1, M denotes an alkyl group having at least 1 but no greater than 20 carbons such as a methyl group or an ethyl group, a cycloalkyl group having at least 5 but no greater than 8 carbons such as a cyclopropyl group or a cyclohexyl group, an alkanoyloxy group having at least 2 but no greater than 20 carbons such as an acetyloxy group or a propanoyloxy group, an alkoxycarbonyl group having at least 2 but no greater than 12 carbons such as a propyloxycarbonyl group or a butyloxycarbonyl group, a monovalent group in which an alkoxy group is linked to one bonding site of a divalent group in which a plurality of polymethylene groups are linked via an ether bond, a phenyl group, a benzoyl group, a benzoyloxy group, a phenoxycarbonyl group, an aralkylcarbonyloxy group having at least 7 but no greater than 13 carbons, an aralkyloxycarbonyl group having at least 7 but no greater than 13 carbons, or an alkylthio group having at least 1 but no greater than 6 carbons. Among them, M is preferably an alkyl group having at least 1 but no greater than 20 carbons or a phenyl group.

When n is 2, M denotes an alkylene group having at least 1 but no greater than 12 carbons such as an ethylene group or a propylene group, a polymethylene group having at least 3 but no greater than 12 carbons such as a tetramethylene group, an oxyalkyleneoxy group having at least 1 but no greater than 12 carbons such as an oxypropyleneoxy group or an oxybutyleneoxy group, a cyclohexylene group, a phenylene group, —CO—O-A-O—CO—, —CO—O—(CH$_2$CH$_2$O)$_m$—CO—, or —CO-A-CO—; A denotes an alkylene group having at least 2 but no greater than 12 carbons, and m denotes an integer of at least 1 but no greater than 20. Among them, M is preferably an alkylene group having at least 1 but no greater than 6 carbons, a polymethylene group having at least 3 but no greater than 12 carbons, or a cyclohexylene group.

Specific examples of the oxime ester compound include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Furthermore, as commercial oxime ester compounds, polymerization initiators available under the product names IRGACURE OXE-01 (1-(4-phenylthiophenyl)-1,2-octanedione-2-(O-benzoyloxime)) and IRGACURE OXE-02 (1-[9-ethyl-6-(2-methylbenzoyl)-9H-carbazol-3-yl]ethanone-1-(O-acetyloxime)) from Ciba Specialty Chemicals may be used.

Colorant

In the present invention, the colored liquid comprises at least a colorant. On the other hand, it is preferable that the undercoat liquid comprises substantially no colorant or comprises a white pigment.

The colorant that can be used in the present invention is not particularly limited, and various types of known pigment and dye may be selected as appropriate and used according to the intended purpose. Among them, as a colorant contained in the colored liquid and, as necessary, in the undercoat liquid, particularly from the viewpoint of excellent light fastness, a pigment is preferable.

Pigments that are preferably used in the present invention are now described.

With regard to the pigments, there is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present invention are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AAA, etc.) and CI Pigment Yellow 17, benzidine-free azo pigments such as CI Pigment Yellow 180 and C.I. Pigment Yellow 200 (Novoperm Yellow 2HG), azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a red or magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI Pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment violet 19 (unsubstituted quinacridone, CINQUASIA Magenta RT-355T; manufactured by Ciba Specialty Chemicals) and CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a blue or cyan color include disazo pigments such as CI Pigment Blue 25 (Dianisidine Blue, etc.), phthalocyanine pigments such as CI Pigment Blue 15 and CI Pigment Blue 15:3 (IRGALITE BLUE GLO; manufactured by Ciba Specialty Chemicals) (Phthalocyanine Blue, etc.), acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

Examples of pigments exhibiting a green color include phthalocyanine pigments such as CI Pigment Green 7 (Phthalocyanine Green) and CI Pigment Green 36 (Phthalocyanine Green), and azo metal complex pigments such as CI Pigment Green 8 (Nitroso Green).

Examples of pigments exhibiting an orange color include isoindoline pigments such as CI Pigment Orange 66 (Isoindoline Orange) and anthraquinone pigments such as CI Pigment Orange 51 (Dichloropyranthrone Orange).

Examples of pigments exhibiting a black color include carbon black, titanium black, and aniline black. Examples of the carbon black include SPECIAL BLACK 250 (manufactured by Degussa).

Specific examples of white pigments that can be used include basic lead carbonate (2PbCO$_3$Pb(OH)$_2$, also known as silver white), zinc oxide (ZnO, also known as zinc white), titanium oxide (TiO$_2$, also known as titanium white), and strontium titanate (SrTiO$_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, a dispersing machine such as a bead mill, a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the colorant, a dispersant such as a surfactant may be added.

Furthermore, when the colorant is added, as a dispersion adjuvant, it is also possible to use a synergist as necessary according to the various types of colorant. The dispersant and dispersion adjuvant are preferably used at least 1 part by weight but no greater than 50 parts by weight relative to 100 parts by weight of the colorant.

In the colored liquid and the undercoat liquid, a solvent may be added as a dispersion medium for various components such as the colorant, or the polymerizable compound, which is a low molecular weight component, may be used as a dispersion medium without using a solvent, and since the colored liquid and the undercoat liquid are preferably an actinic radiation curing type liquid and are cured after being applied on top of a recording medium, it is preferable for it to be solvent-free. This is because, if solvent remains in the image formed from the cured colored liquid and the cured undercoat liquid, the solvent resistance is degraded and the VOC (Volatile Organic Compound) problem of residual solvent occurs. From this viewpoint, it is preferable to use the polymerizable compound as a dispersion medium and it is particularly preferable to select a polymerizable compound having the lowest viscosity in terms of improvement of dispersion suitability and handling properties of an ink composition.

Since excellent coloration is achieved by finer particles, it is preferable for the average particle size of the colorant used here to be at least 0.01 µm but no greater than 0.4 µm, and more preferably at least 0.02 µm but no greater than 0.2 µm. In order to make the maximum particle size be no greater than 3 µm, and preferably no greater than 1 µm, it is preferable for the colorant, the dispersant, and the dispersion medium to be selected, and dispersion conditions and filtration conditions to be set. By such control of particle size, clogging of a head nozzle can be suppressed, and the storage stability of the colored liquid and the undercoat liquid, and the transparency and curing sensitivity of the colored liquid and the undercoat liquid can be maintained. In the present invention, by using a dispersant having excellent dispersibility and stability, even when a microparticulate colorant is used, a uniform and stable dispersion is obtained.

The particle size of the colorant in the colored liquid and the undercoat liquid may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement using the laser diffraction/scattering method is employed.

Surfactant

The colored liquid and the undercoat liquid preferably comprise a surfactant, and it is more preferably that the undercoat liquid comprises a surfactant.

Examples of the surfactant used in the present invention include the surfactants below. For example, those described in JP-A-62-173463 and JP-A-62-183457 can be cited. Specific examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. As the above known surfactants, an organofluoro compound may be used. The organofluoro compound is preferably hydrophobic. Examples of the organofluoro compound include fluorine-based surfactants, oil-like fluorine-based compounds (e.g. fluorine oils), and solid fluorine compound resins (e.g. tetrafluoroethylene resin), and those described in JP-B-57-9053 (8th to 17th columns) and JP-A-62-135826.

The surfactant used in the present invention is not particularly limited to the surfactants described above, and it may be an additive that, for the concentration added, is capable of reducing the surface tension efficiently.

Other Additives

The colored liquid and the undercoat liquid in the present invention may comprise, in addition to the polymerizable compound, the polymerization initiator, etc., various types of additive according to the intended purpose. For example, from the viewpoint of improving the weatherability of an image that is obtained, a UV absorber may be used. Furthermore, in order to improve the storage stability of the colored liquid and the undercoat liquid, an antioxidant may be added.

Moreover, it is possible to add various types of organic and metal complex antifading agents, a conductive salt such as potassium thiocyanate, lithium nitrate, ammonium thiocyanate, or dimethylamine hydrochloride for the purpose of controlling discharge physical properties, or a trace amount of an organic solvent in order to improve the adhesion between an undercoat liquid and a substrate.

Furthermore, various types of high molecular weight compounds may be added in order to adjust coating physical properties. Examples of the high molecular weight compounds include acrylic polymers, polyvinylbutyral resins, polyurethane resins, polyamide resins, polyester resins, epoxy resins, phenolic resins, polycarbonate resins, polyvinylbutyral resins, polyvinylformal resins, shellac, vinylic resins, acrylic resins, rubber-based resins, waxes, and other natural resins. They may be used in a combination of two or more types.

In addition to the above, the composition may contain as necessary, for example, a leveling additive, a matting agent, a wax for adjusting coating physical properties, or a tackifier that does not inhibit polymerization in order to improve the adhesion to a polyolefin, PET, etc.

Relationship Between Surface Tension of Colored Liquid and Surface Tension of Undercoat Liquid From the viewpoint of preventing a formed image from spreading for a long period of time before curing of the colored liquid applied to a recording medium is started, when the surface tension of the colored liquid is γA (mN/m) and the surface tension of the undercoat liquid is γB (mN/m), the relationship between γA and γB preferably satisfies γA>γB, more preferably satisfies γA−γB≧1, and particularly preferably satisfies γA−γB≧2.

The surface tension is a value obtained by measuring at a liquid temperature of 25° C. by the Wilhelmy method using a standard surface tensiometer (e.g. a CBVP-Z surface tensiometer manufactured by Kyowa Interface Science Co., Ltd.).

(2) Inkjet Recording Method

Recording Method

The inkjet recording method of the present invention uses the ink set for inkjet recording, which comprises the colored liquid for forming an image and the undercoat liquid used as an undercoat liquid.

The recording method comprises at least 3 steps, that is, (i) a step of applying the undercoat liquid on top of a recording medium, (ii) a step of semi-curing the undercoat liquid, and (iii) a step of carrying out image formation by discharging the colored liquid on top of the semi-cured undercoat liquid.

From the viewpoint of improving the scratch resistance or adhesion of an image, it is preferable for the method to comprise, after the above-mentioned three steps, (iv) a step of completely curing the image. Furthermore, the colored liquid in the present invention preferably employs as a multicolor ink set a plurality of colored liquid. When a multicolor ink set is used in this way, it is further preferable, after each colored liquid is applied to the recording medium, to carry out a step of semi-curing the colored liquid droplets. For example, when a secondary color is formed from a colored liquid A and a colored liquid B, each having different hue, it is preferable that colored liquid B is applied on top of semi-cured colored liquid A after the step of semi-curing colored liquid A.

Therefore, the most preferred process for the inkjet recording method of the present invention is as shown in FIG. 1.

FIG. 1 shows a schematic diagram of an inkjet recording method that can suitably be used in the present invention. A detailed explanation is given below by reference to FIG. 1.

A recording medium 6 is transported by recording medium transport means 7A and 7B, and is transported in the left to right direction in FIG. 1.

The recording medium and the recording medium transport means are not particularly limited; in the present embodiment shown in FIG. 1 a plastic film is used as the recording medium, and as the recording medium transport means a film unwinding machine (7A) and a film winding machine (7B) are used.

In a first step, an undercoat liquid is applied on top of the recording medium 6 by means 1 for applying an undercoat liquid. As an example of the means for applying an undercoat liquid, a roll coater can be cited.

Subsequently, in a second step, the undercoat liquid applied on top of the recording medium 6 is semi-cured by means 2 for semi-curing an undercoat liquid. As an example of the means for semi-curing an undercoat liquid, a UV light source can be cited.

In a third step, a color image is formed on top of the semi-cured coating of the undercoat liquid on top of the recording medium 6 by means 3Y for applying a colored liquid. In FIG. 1, a yellow colored liquid is applied to thus form a yellow image. As an example of the means 3Y for applying a yellow colored liquid, a yellow inkjet recording head can be cited. In a fourth step, the yellow colored liquid applied in the third step is semi-cured by means 4Y for semi-curing a colored liquid. In FIG. 1, a UV light source is used as means for semi-curing a colored liquid, and the yellow colored liquid that has been applied on top of the coating of the undercoat liquid is semi-cured.

In a fifth step, a cyan colored liquid is applied on top of the coating of the undercoat liquid and/or the yellow colored liquid semi-cured on the recording medium by means 3C for applying a cyan colored liquid to thus form a cyan image. As an example of the means 3C for applying a cyan colored liquid, a cyan inkjet recording head can be cited. In a sixth step, the cyan colored liquid that has been applied in the fifth step is semi-cured. In FIG. 1, a UV light source is used as means 4C for semi-curing a cyan colored liquid, and the cyan colored liquid applied on top of the coating of the undercoat liquid and/or the yellow colored liquid is semi-cured.

In a similar manner, in a seventh step, a magenta image is formed on top of the coating of any one of the undercoat liquid, the yellow colored liquid, and the cyan colored liquid by means 3M for applying a magenta colored liquid, and in an eighth step the magenta colored liquid thus applied is semi-cured by means 4M for semi-curing a magenta colored liquid.

Furthermore, in a ninth step, a black image is formed on top of the coating of any one of the undercoat liquid, the yellow colored liquid, the cyan colored liquid, and the magenta colored liquid by means 3K for applying a black colored liquid. In a tenth step, the black colored liquid is semi-cured by means 4K for semi-curing a black colored liquid.

Subsequently, in an eleventh step, a full color image thus formed is completely cured by means 5 for completely curing a full color image.

It is possible to omit the tenth step, and in this case the recording medium to which the final colored liquid has been applied may be completely cured without undergoing the semi-curing step.

Each step is now explained.

Step of Applying Undercoat Liquid on Top of Recording Medium

In the step of applying the undercoat liquid on top of the recording medium, it is preferable to apply the undercoat liquid on top of the recording medium in the same region as for an image formed by discharging droplets of the colored liquid or in a region that is wider than the image.

Furthermore, with regard to the amount of undercoat liquid applied (ratio by weight per unit area), it is preferably at least 0.05 but no greater than 5 when the maximum amount of colored liquid applied (per color) is 1, is more preferably at least 0.07 but no greater than 4, and is yet more preferably at least 0.1 but no greater than 3.

In the inkjet recording method of the present invention, as means for applying the undercoat liquid on top of the recording medium, a coating machine, an inkjet nozzle, etc. may be used.

The coating machine is not particularly limited and may be appropriately selected from known coating machines according to the intended purpose, etc., and examples thereof include an air doctor coater, a blade coater, a rod coater, a knife coater, a squeegee coater, an immersion coater, a reverse roll coater, a transfer roll coater, a gravure coater, a kiss roll coater, a cast coater, a spray coater, a curtain coater, and an extrusion coater. Details may be referred to in 'Kotingu Kogaku (Coating Engineering)' by Yuji Harazaki.

Among them, in terms of equipment cost, application of the undercoat liquid on top of the recording medium is preferably carried out by coating using a relatively inexpensive bar coater or spin coater or by applying by an inkjet method.

Step of Semi-Curing Undercoat Liquid and/or Colored Liquid

In the present invention, 'semi-curing' means partial curing (partially cured; partial curing) and refers to a state in which the undercoat liquid and/or the colored liquid are partially cured but not completely cured. When the undercoat liquid applied on top of the recording medium (substrate) or the colored liquid discharged on top of the undercoat liquid is semi-cured, the degree of curing may be nonuniform. For example, it is preferable that curing of the undercoat liquid and/or the colored liquid progresses in the depth direction.

Examples of methods for semi-curing an undercoat liquid and/or colored liquid include known viscosity increasing methods such as (1) a method employing the so-called aggregation phenomenon by applying a basic compound to an acidic polymer or by applying an acidic compound or a metal compound to a basic polymer, (2) a method in which the undercoat liquid and/or colored liquid are prepared in advance so as to have a high viscosity, a low boiling point organic solvent is added thereto so as to make the viscosity low, and the low boiling point organic solvent is evaporated so as to restore the original high viscosity, (3) a method in which the undercoat liquid and/or colored liquid prepared so as to have a high viscosity is heated, and cooled to restore the original high viscosity, and (4) a method in which actinic radiation or heat is applied to the undercoat liquid and/or colored liquid so as to initiate a semi-curing reaction. Among them, method (4), in which actinic radiation or heat is applied to the undercoat liquid and/or colored liquid so as to initiate a semi-curing reaction, is preferable.

The method in which actinic radiation or heat is applied so as to cause a semi-curing reaction is a method in which a polymerization reaction of a polymerizable compound on the surface of the undercoat liquid and/or colored liquid applied to a recording medium is incompletely carried out.

When a radically polymerizable undercoat liquid or colored liquid is polymerized in an atmosphere containing a large amount of oxygen, such as an atmosphere of air or air partially displaced by an inert gas, radical polymerization tends to be inhibited on the surface of droplets of the colored liquid (hereinafter, also called colored liquid droplets) or the undercoat liquid layer applied on top of the recording medium, due to the radical polymerization inhibition effect of oxygen. As a result, semi-curing is nonuniform, curing advances further in the interior of the undercoat liquid layer or the colored liquid droplets, and curing of the surface tends to be delayed. The undercoat liquid layer referred to here is the layer of undercoat liquid applied on top of the substrate.

When a cationically polymerizable undercoat liquid or colored liquid is polymerized in an atmosphere containing moisture, due to the cationic polymerization inhibition effect of moisture, curing advances further in the interior of the undercoat liquid layer or the colored liquid droplets applied on top of the recording medium, and curing of the surface tends to be delayed.

In the present invention, when a radically photopolymerizable undercoat liquid or colored liquid is used in the presence of oxygen, which inhibits radical polymerization, thus carrying out partial photocuring, curing of the undercoat liquid and/or the colored liquid advances further in the interior than in the exterior.

In particular, the polymerization reaction is easily inhibited on the surface of the undercoat liquid compared with the interior thereof due to the influence of oxygen in the air. It is therefore possible to semi-cure the undercoat liquid by controlling the conditions under which actinic radiation or heat is applied.

Among them, it is preferable to carry out semi-curing by irradiation with actinic radiation. As the actinic radiation, α rays, γ rays, an electron beam, X rays, ultraviolet rays, visible light, infrared light, etc. may be used. Among them, ultraviolet rays or visible light are preferable, and ultraviolet rays are more preferable. Furthermore, although it depends on the absorption characteristics of a sensitizing dye, the peak wavelength of the actinic radiation is preferably 200 to 600 nm, more preferably 300 to 450 nm, and yet more preferably 350 to 420 nm.

The amount of energy necessary for semi-curing the undercoat liquid and/or the colored liquid depends on the type and content of a polymerization initiator, but it is preferably on the order of 1 to 500 mJ/cm$^2$ when energy is provided by actinic radiation. When energy is provided by heating, heating is preferably carried out for 0.1 to 1 sec. under conditions that give a surface temperature of the recording medium in the range of 40° C. to 80° C.

Due to the actinic radiation or heat provided by actinic light or heating, etc., generation of an active species as a result of decomposition of a polymerization initiator is promoted, and as a result an increase in the active species or an increase in temperature a curing reaction by polymerization or crosslinking, by means of the active species, of a polymerizable or crosslinking material is promoted.

Furthermore, increasing the viscosity (viscosity increase) is also suitably carried out by irradiation with actinic light or heating.

By firing droplets of a colored liquid onto a semi-cured undercoat liquid, or firing droplets of a different colored liquid (in particular, a colored liquid having a different color) onto the semi-cured colored liquid, a desirable technical effect can be given to the quality of the printed material obtained. Furthermore, the mode of action thereof can be ascertained by examination of a cross section of the printed material.

An area (high density area) when about 12 pL (picoliter; the same applies below) droplets of a colored liquid are fired at a high density onto an approximately 5 μm thick undercoat liquid in a semi-cured state provided on a substrate is explained as one example.

Figure 2:
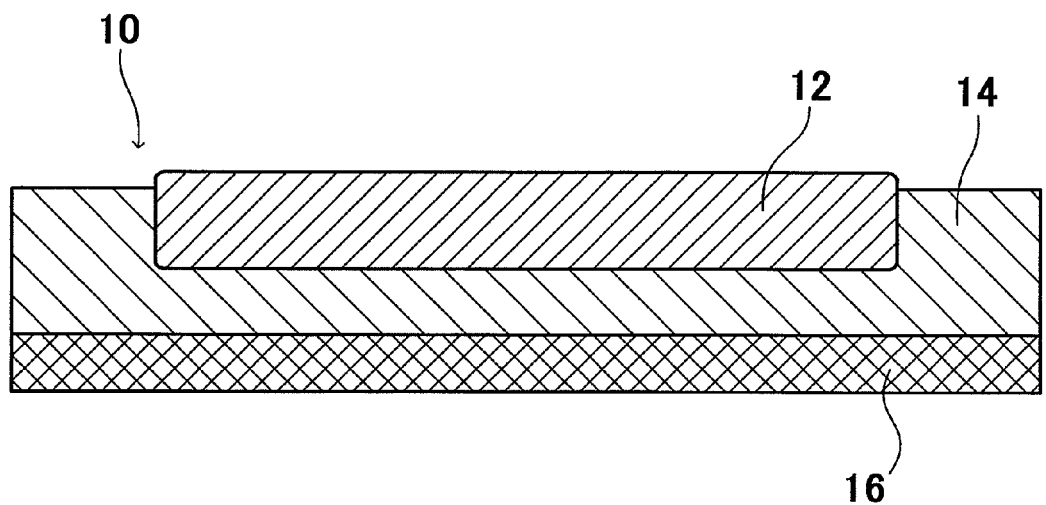
FIG. 2 is a cross-sectional schematic diagram showing one embodiment of a printed material obtained by firing droplets of a colored liquid onto a semi-cured undercoat liquid layer.

FIG. 2 is a cross-sectional schematic diagram showing one embodiment of a printed material obtained by firing droplets of a colored liquid onto a semi-cured undercoat liquid layer. In the preparation of the printed material shown in FIG. 2, the undercoat liquid is semi-cured, and curing has advanced further on the substrate 16 side than in the surface layer. FIG. 2 shows an undercoat layer 14 in which a colored liquid is applied to a semi-cured undercoat liquid layer.

In this case, it is observed that a cross section of an obtained image 10 has the following three characteristics.
(1) Part of a colored liquid cured material 12 is exposed on the surface,
(2) Part of the colored liquid cured material 12 has sunk into the undercoat layer 14, and
(3) the undercoat layer 14 is present between the lower side of the colored liquid cured material 12 and the substrate 16.

That is, a printed material obtained by applying a colored liquid on top of a semi-cured undercoat liquid layer has the cross section shown schematically in FIG. 2. When the above-mentioned conditions (1), (2), and (3) are satisfied, it can be said that a colored liquid is applied to a semi-cured undercoat liquid. In this case, droplets of the colored liquid fired at high density are joined together to form a colored coating, thus giving a uniform and high density. The undercoat layer referred to here means a layer obtained by curing an undercoat liquid layer.

Figure 3:
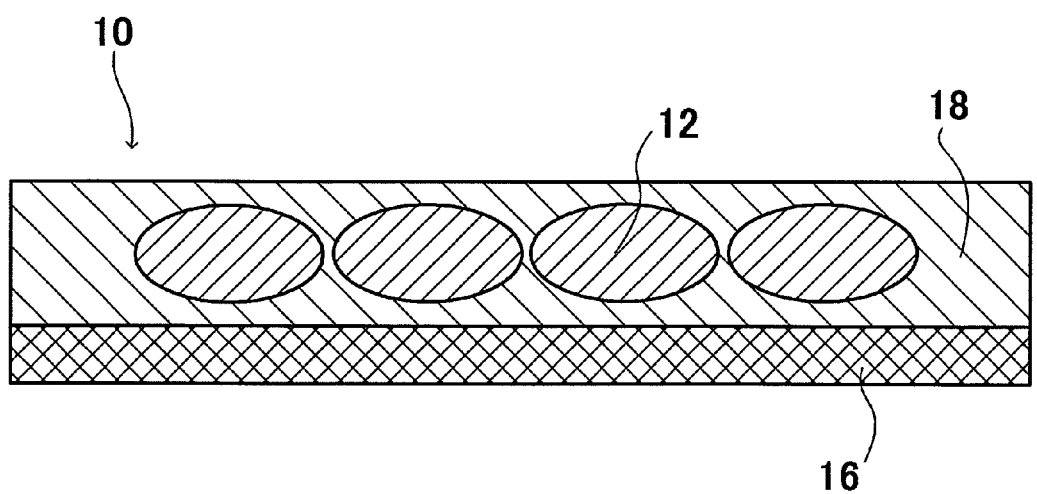
FIG. 3 is a cross-sectional schematic diagram showing one embodiment of a printed material obtained by firing droplets of a colored liquid onto an uncured undercoat liquid layer.
Figure 4:
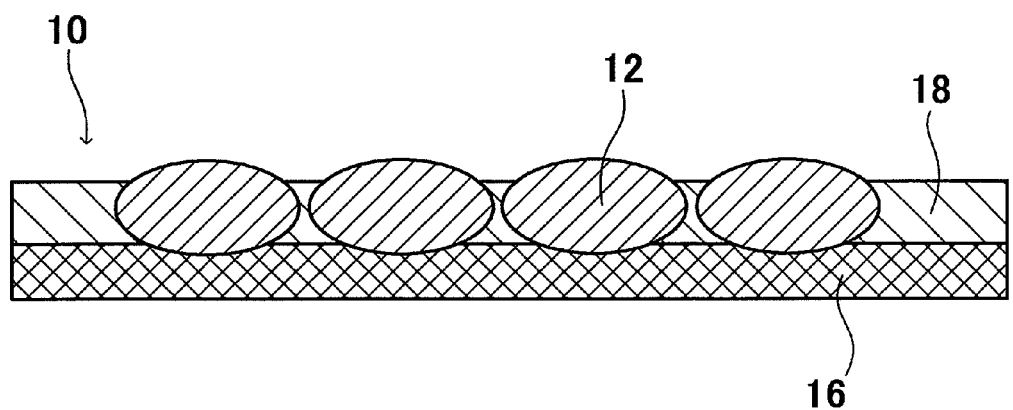
FIG. 4 is a cross-sectional schematic diagram showing another embodiment of a printed material obtained by firing droplets of a colored liquid onto an uncured undercoat liquid layer.

FIG. 3 and FIG. 4 are cross-sectional schematic diagrams showing one embodiment of a printed material obtained by firing droplets of a colored liquid onto an uncured undercoat liquid layer. FIG. 3 and FIG. 4 show an undercoat layer 18 in which the colored liquid is applied to the uncured undercoat liquid layer.

When a droplet of a colored liquid is fired onto an uncured undercoat liquid layer, the whole of the colored liquid sinks into the undercoat liquid layer and/or no undercoat liquid is present beneath the colored liquid. Specifically, in FIG. 3, in a cross-sectional slice of an obtained image 10, a colored liquid cured material 12 has completely sunk into the undercoat layer 18, and no part of the colored liquid cured material 12 is exposed on the surface. Furthermore, as shown in FIG. 4, in a cross-sectional slice of an obtained image 10, no undercoat layer 18 is present beneath the colored liquid cured material 12.

In this case, even when the colored liquid is applied at high density, since droplets are isolated from each other, this causes a decrease in color density.

Figure 5:
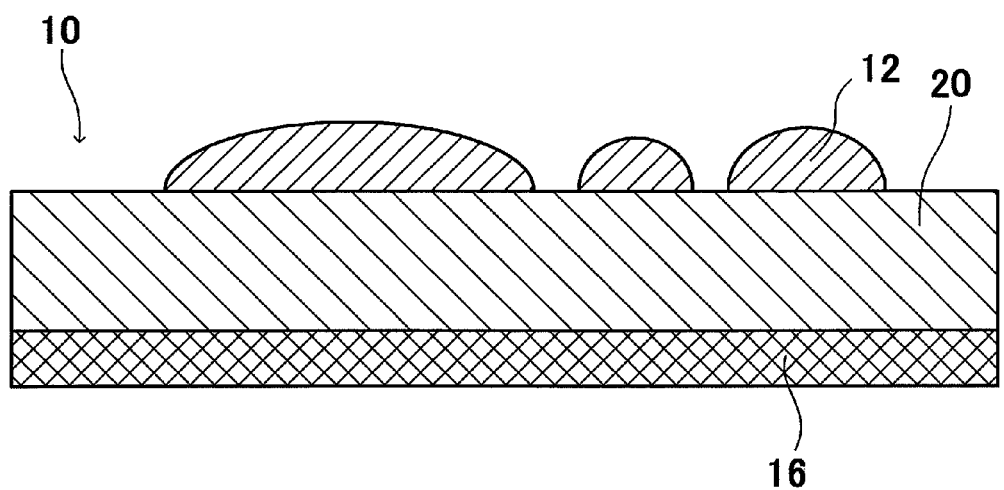
FIG. 5 is a cross-sectional schematic diagram showing one embodiment of a printed material obtained by firing droplets of a colored liquid onto a completely cured undercoat liquid layer.

FIG. 5 is a cross-sectional schematic diagram showing one embodiment of a printed material obtained by firing droplets of a colored liquid onto a completely cured undercoat liquid layer. FIG. 5 shows an undercoat layer 20 in which the colored liquid is applied to the completely cured undercoat liquid layer.

When a droplet of a colored liquid is fired onto a completely cured undercoat liquid layer, the colored liquid does not sink into the undercoat liquid layer. Specifically, as shown in FIG. 5, the colored liquid cured material 12 has not sunk into the undercoat layer 20.

In such a state, fired droplet interference might be caused, and a uniform colored liquid coating layer cannot be formed, thus degrading color reproduction.

From the viewpoint of forming a uniform colored liquid layer (colored coating) without colored liquid droplets being isolated from each other when the droplets are applied at high density and from the viewpoint of suppressing the occurrence of fired droplet interference, the amount of undercoat liquid transferred per unit area is preferably sufficiently smaller than the maximum amount of colored liquid droplets applied per unit area. That is, when the amount (weight) of undercoat liquid layer transferred per unit area is M (undercoat liquid) and the maximum weight of the colored liquid applied per unit area is m (colored liquid), M (undercoat liquid) and m (colored liquid) preferably satisfy the following relationship.

$$[m\text{(colored liquid)}/30] \leq [M\text{(undercoat liquid)}] \leq [m\text{(colored liquid)}]$$

It is more preferable that $[m \text{ (colored liquid)}/20] \leq [M \text{ (undercoat liquid)}] \leq [m \text{ (colored liquid)}/3]$, and yet more preferable that $[m \text{ (colored liquid)}/10] \leq [M \text{ (undercoat liquid)}] \leq [m \text{ (colored liquid)}/5]$. The maximum weight of the colored liquid applied per unit area here is the maximum weight per color.

It is preferable that $[m \text{ (colored liquid)}/30] \leq [M \text{ (undercoat liquid)}]$ since the occurrence of fired droplet interference can be suppressed and, moreover, dot size reproducibility is excellent. Furthermore, it is preferable that $M \text{ (undercoat liquid)} \leq m \text{ (colored liquid)}$ since a uniform colored liquid layer can be formed and a high density image can be obtained.

The amount of undercoat liquid layer transferred per unit area is determined by the transfer test described below. After the semi-curing step is completed (e.g. after irradiating with actinic radiation) but before firing droplets of a colored liquid, a permeable medium such as plain paper is pressed against the semi-cured undercoat liquid layer, and the amount of undercoat liquid transferred to the permeable medium is defined by measurement of the weight.

For example, when the maximum amount of colored liquid discharged is 12 pL per pixel (dot) at a fired droplet density of 600×600 dpi, the maximum weight m (colored liquid) of the colored liquid applied per unit area is 0.74 mg/cm$^2$ (here, it is assumed that the density of the colored liquid is about 1.1 g/cm$^3$). The amount of undercoat liquid layer transferred is therefore preferably at least 0.025 mg/cm$^2$ but no greater than 0.74 mg/cm$^2$ per unit area, more preferably at least 0.037 mg/cm$^2$ but no greater than 0.25 mg/cm$^2$, and yet more preferably at least 0.074 mg/cm$^2$ but no greater than 0.148 mg/cm$^2$.

In the present invention, dpi means the number of dots per 2.54 cm.

When a secondary color is formed from a colored liquid A and a colored liquid B, it is preferable that colored liquid B is applied on top of semi-cured colored liquid A.

Figure 6:
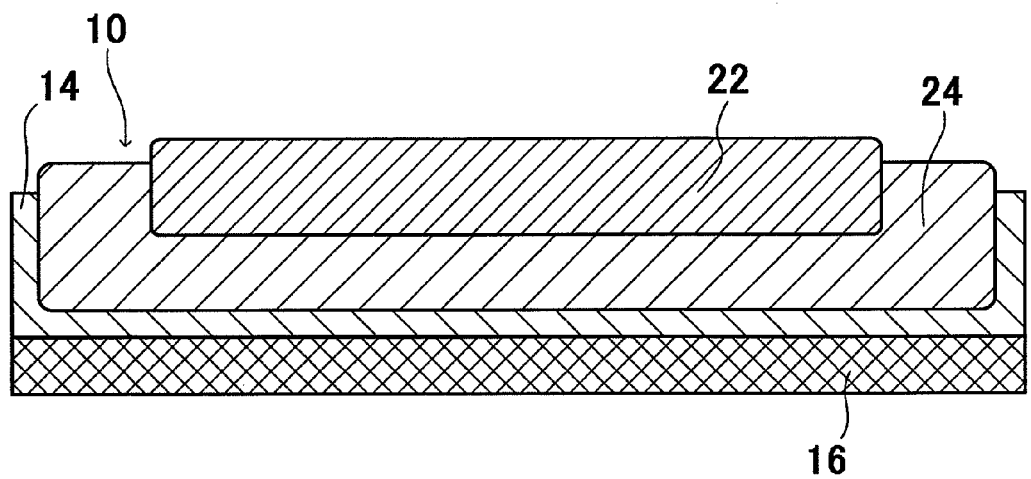
FIG. 6 is a cross-sectional schematic diagram showing one embodiment of a printed material obtained by firing droplets of colored liquid B onto semi-cured colored liquid A.

FIG. 6 is a cross-sectional schematic diagram showing one embodiment of a printed material obtained by firing droplets of colored liquid B onto semi-cured colored liquid A. FIG. 6 shows a colored liquid A cured material 24 and a colored liquid B cured material 22 obtained by applying colored liquid B onto semi-cured colored liquid A.

When a droplet of colored liquid B is fired onto semi-cured colored liquid A, part of colored liquid B sinks into colored liquid A, and colored liquid A is present beneath colored liquid B. That is, in a printed material obtained by applying colored liquid B on top of semi-cured colored liquid A, as shown in FIG. 6, part of the colored liquid B cured material 22 is exposed on the surface, and part of the colored liquid B cured material 22 has sunk into the colored liquid A cured material 24. Furthermore, the colored liquid A cured material 24 is present beneath the colored liquid B cured material 22. A cured coating of colored liquid A (colored coating A, the colored liquid A cured material 24 in FIG. 6) and a cured coating of colored liquid B (colored coating B, the colored liquid B cured material 22 in FIG. 6) are in a layered state, thus enabling good color reproduction to be obtained.

Figure 7:
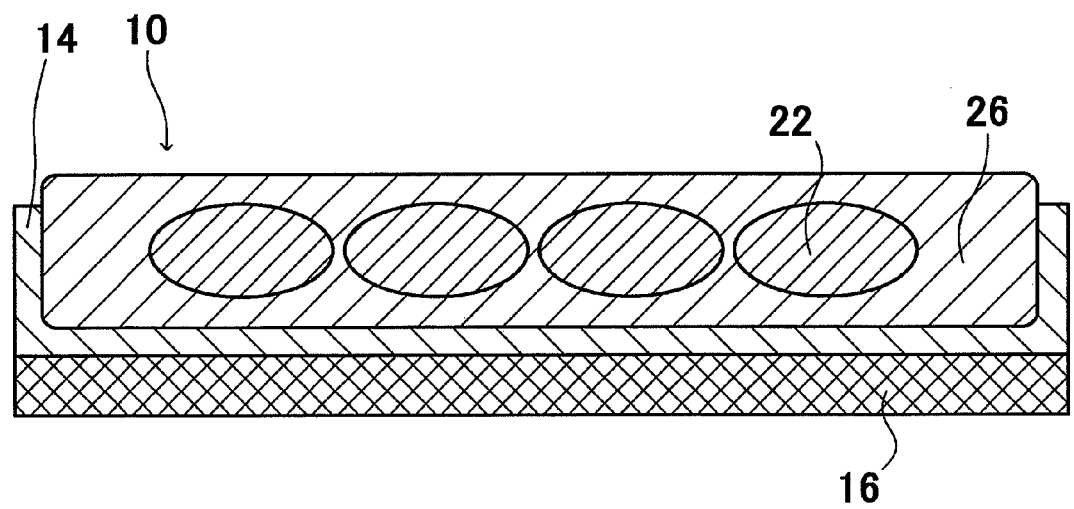
FIG. 7 is a cross-sectional schematic diagram showing one embodiment of a printed material obtained by firing droplets of colored liquid B onto uncured colored liquid A.
Figure 8:
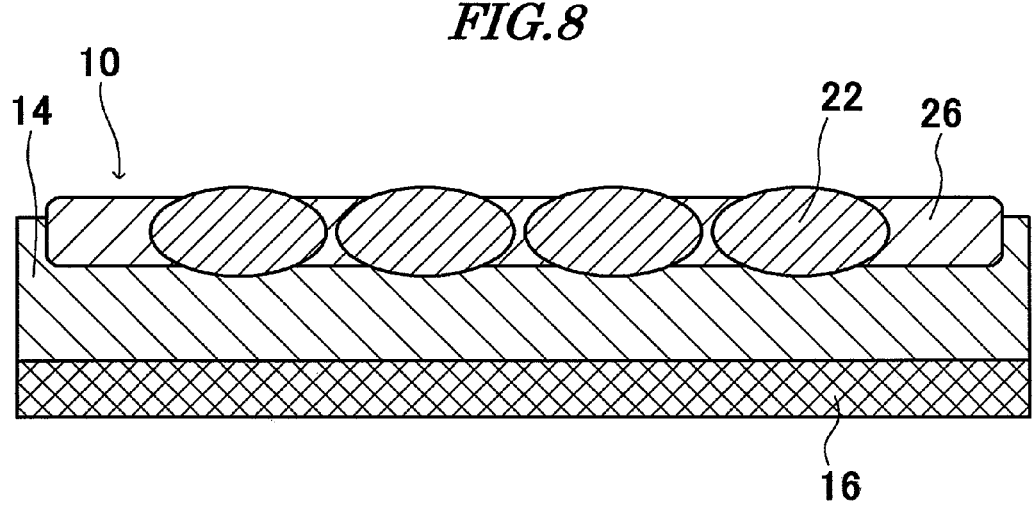
FIG. 8 is a cross-sectional schematic diagram showing one embodiment of a printed material obtained by firing droplets of colored liquid B onto uncured colored liquid A.

FIG. 7 and FIG. 8 are cross-sectional schematic diagrams showing one embodiment of a printed material obtained by firing droplets of colored liquid B onto uncured colored liquid A. FIG. 7 shows a colored liquid A cured material 26 and a colored liquid B cured material 22 obtained by applying colored liquid B onto uncured colored liquid A.

When a droplet of colored liquid B is fired onto uncured colored liquid A, the whole of colored liquid B sinks into colored liquid A and/or no colored liquid A is present beneath colored liquid B. That is, when a cross-sectional view of the image thus obtained is examined, as shown in FIG. 7 the whole of the colored liquid B cured material 22 has sunk into the colored liquid A cured material 26 and/or as shown in FIG. 8 no colored liquid A cured material 26 is present beneath the colored liquid B cured material 22. In this case, even when colored liquid B is applied at high density, droplets are isolated from each other, thus causing a degradation in secondary color saturation.

Figure 9:
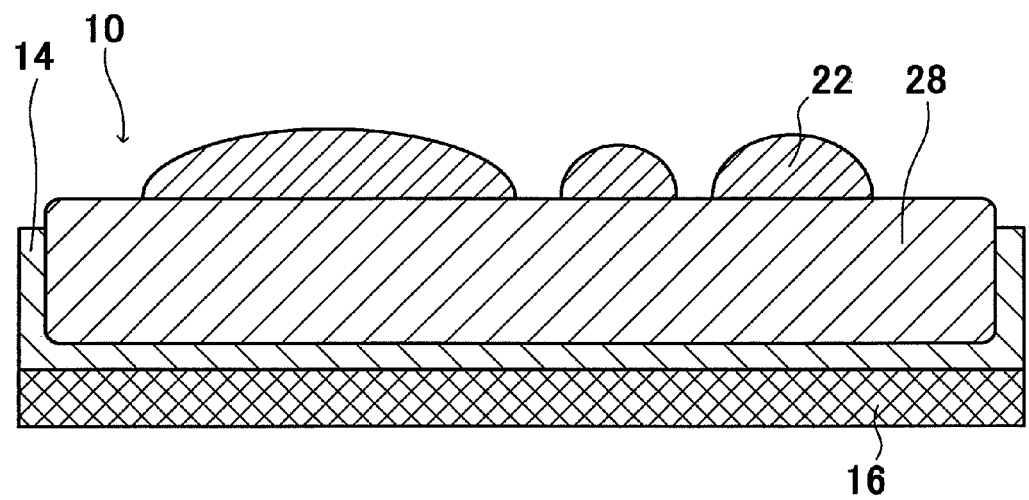
FIG. 9 is a cross-sectional schematic diagram showing one embodiment of a printed material obtained by firing droplets of colored liquid B onto completely cured colored liquid A.

FIG. 9 is a cross-sectional schematic diagram showing one embodiment of a printed material obtained by firing droplets of colored liquid B onto completely cured colored liquid A. FIG. 9 shows a colored liquid A cured material 28 and a colored liquid B cured material 22 obtained by applying colored liquid B onto completely cured colored liquid A. When a droplet of colored liquid B is fired onto completely cured colored liquid A, colored liquid B does not sink into colored liquid A. As shown in FIG. 9, in a cross-sectional view of an image that is obtained, the colored liquid B cured material 22 has not sunk into the colored liquid A cured material 28. Such a state causes the occurrence of fired droplet interference, a uniform colored liquid coating layer cannot be formed, and color reproducibility is degraded.

From the viewpoint of forming a uniform colored liquid B layer without colored liquid B droplets being isolated from each other when the droplets are applied at high density and from the viewpoint of suppressing the occurrence of fired droplet interference, the amount of colored liquid A transferred per unit area is preferably sufficiently smaller than the maximum amount of colored liquid B droplets applied per unit area. That is, when the amount (weight) of colored liquid A layer transferred per unit area is M (colored liquid A) and the maximum weight of colored liquid B discharged per unit area is m (colored liquid B), M (colored liquid A) and m (colored liquid B) preferably satisfy the following relationship.

$$[m\text{(colored liquid }B\text{)}/30] \leq [M\text{(colored liquid }A\text{)}] \leq [m\text{(colored liquid }B\text{)}]$$

It is more preferable that $[m \text{ (colored liquid B)}/20] \leq [M \text{ (colored liquid A)}] \leq [m \text{ (colored liquid B)}/3]$, and yet more preferable that [m (colored liquid B)/10]≦[M (colored liquid A)]≦[m (colored liquid B)/5].

It is preferable that [m (colored liquid B)/30]≦[M (colored liquid A)] since the occurrence of fired droplet interference can be suppressed and, moreover, dot size reproducibility is excellent. Furthermore, it is preferable that M (colored liquid A)≦m (colored liquid B) since a uniform colored liquid layer can be formed and a high density image can be obtained.

The amount (weight) of colored liquid A transferred per unit area is determined by the transfer test described below. After the semi-curing step is completed (e.g. after irradiating with actinic radiation) but before firing droplets of colored liquid B, a permeable medium such as plain paper is pressed against the semi-cured colored liquid A layer, and the amount of colored liquid A transferred to the permeable medium is defined by measurement of the weight.

For example, when the maximum amount of colored liquid B discharged is 12 pL per pixel at a fired droplet density of 600×600 dpi, the maximum weight m (colored liquid) of the colored liquid B discharged per unit area is 0.74 mg/cm$^2$ (here, it is assumed that the density of colored liquid B is about 1.1 g/cm$^3$). The amount of colored liquid A transferred is therefore preferably at least 0.025 mg/cm$^2$ but no greater than 0.74 mg/cm$^2$ per unit area, more preferably at least 0.037 mg/cm$^2$ but no greater than 0.25 mg/cm$^2$, and yet more preferably at least 0.074 mg/cm$^2$ but no greater than 0.148 mg/cm$^2$.

When a curing reaction is based on an ethylenically unsaturated compound or a cyclic ether, the degree of unpolymerization may, as described later, be measured quantitatively by the reaction ratio of an ethylenically unsaturated group or a cyclic ether group.

When a semi-cured state of the undercoat liquid and/or colored liquid is realized by a polymerization reaction of a polymerizable compound for which polymerization is initiated by irradiation with actinic radiation or heating, from the viewpoint of improvement of scratch resistance of a printed material, it is preferable for the degree of unpolymerization (A (after polymerization)/A (before polymerization)) to be at least 0.2 but no greater than 0.9, more preferably at least 0.3 but no greater than 0.9, and particularly preferably at least 0.5 but no greater than 0.9.

Here, A (after polymerization) is an infrared absorption peak due to a polymerizable group after the polymerization reaction, and A (before polymerization) is an infrared absorption peak due to the polymerizable group before the polymerization reaction. For example, when the polymerizable compound contained in the undercoat liquid and/or colored liquid is an acrylate monomer or a methacrylate monomer, an absorption peak due to the polymerizable group (acrylate group, methacrylate group) is observed at around 810 cm$^{-1}$, and the degree of unpolymerization is preferably defined by the absorbance of the peak. Furthermore, when the polymerizable compound is an oxetane compound, an absorption peak due to the polymerizable group (oxetane ring) is observed at around 986 cm$^{-1}$, and the degree of unpolymerization is preferably defined by the absorbance of the peak. When the polymerizable compound is an epoxy compound, an absorption peak due to the polymerizable group (epoxy group) is observed at around 750 cm$^{-1}$, and the degree of unpolymerization is preferably defined by the absorbance of the peak.

Moreover, as means for measuring an infrared absorption spectrum, a commercial infrared spectrophotometer may be used; either a transmission type or a reflectance type may be used, and it is preferably selected as appropriate depending on the form of a sample. For example, an FTS-6000 infrared spectrophotometer manufactured by Bio-Rad Laboratories, Inc. may be used for measurement.

Step of Applying Colored Liquid on Top of Recording Medium

In the present invention, droplets of the colored liquid that are discharged on top of a coating of the semi-cured undercoat liquid and/or colored liquid are preferably fired at a droplet size of at least 0.1 pL but no greater than 100 pL (preferably via an inkjet nozzle). When the droplet size is in the above-mentioned range, it is effective in terms of being able to draw a high sharpness image at high density. It is more preferably at least 0.5 pL but no greater than 50 pL.

The droplet firing interval until a droplet of a colored liquid is fired after applying an undercoat liquid is preferably at least 5 μsec but no greater than 10 sec. When the droplet firing interval is in the above-mentioned range, it is effective in terms of the effects of the present invention being clearly exhibited. The droplet firing interval of colored liquid droplets is more preferably at least 10 μsec but no greater than 5 sec, and particularly preferably at least 20 μsec but no greater than 5 sec.

As means for applying a colored liquid, an inkjet head is preferably used. Preferred examples of the inkjet head include heads employing a charge control system in which an ink is discharged by utilizing an electrostatic attraction force, a drop-on-demand system (pressure pulse system) in which oscillatory pressure of a piezo element is utilized, an acoustic inkjet system in which an electrical signal is changed into an acoustic beam and applied to an ink, and the ink is discharged by utilizing radiation pressure, a thermal inkjet (Bubblejet (registered trademark)) in which a bubble is formed by heating an ink and the pressure thus generated is utilized, etc.

Step of Completely Curing Image

'Complete curing' in the present invention refers to a state in which the interior and the surface of an undercoat liquid and a colored liquid are completely cured. Specifically, it can be judged by pressing a permeable medium such as plain paper against the surface of the undercoat liquid or colored liquid after the complete curing step has ended (e.g. after irradiation with actinic radiation or heating) and checking whether or not the composition is transferred to the permeable medium. That is, when there is no transfer at all, it is called a completely cured state.

With regard to curing means for completely curing an image, a light source for emitting actinic radiation, a heater such as an electric heater or an oven, etc. may be selected according to the intended purpose.

As the actinic radiation, in addition to ultraviolet rays, visible light, α rays, γ rays, X rays, an electron beam, etc. may be used. Among them, an electron beam, ultraviolet rays, and visible light are preferable as the actinic radiation from the viewpoint of cost and safety, and ultraviolet rays are particularly preferable.

The amount of energy necessary for a complete curing reaction depends on the composition and, in particular, the type and content of a polymerization initiator, and it is generally on the order of at least 100 mJ/cm$^2$ but no greater than 10,000 mJ/cm$^2$.

Preferred examples of equipment for emitting actinic radiation include a metal halide lamp, a mercury lamp, and an LED light source.

When energy is applied by heating, as heating means a machine emitting heat may be used. In this case, a substrate to which an undercoat liquid and a colored liquid has been applied is preferably heated under conditions that give a surface temperature of the substrate in a temperature range of at least 50° C. but no greater than 100° C., for at least 0.5 sec but no greater than 10 sec.

When heating is carried out, a curing reaction due to polymerization or crosslinking of a polymerizable compound is promoted by an increase in temperature, and a shape formed by collision of droplets becomes stronger. This enables a strong image to be obtained, which is preferable.

Heating may be carried out by the use of non-contact type heating means, and heating equipment involving passage through a heating furnace such as an oven, or heating equipment involving exposure of the whole surface to ultraviolet rays, visible light, infrared light, etc. is suitably used.

Preferred examples of a light source for exposure as the heating means include a metal halide lamp, a xenon lamp, a tungsten lamp, a carbon arc lamp, and a mercury lamp.

In FIG. 1, four colored liquids, that is, yellow, cyan, magenta, and black are used, but the present invention is not limited thereto, and a white colored liquid may be used. The order in which colored liquids are discharged is not particularly limited, but it is preferable to start application to a recording medium from a colored liquid having a high lightness; when four colors, that is, yellow, cyan, magenta, and black are used, they are preferably applied on top of the recording medium in the order yellow→cyan→magenta→black. Furthermore, when five colored liquids with white added are used, they are preferably applied on top of the recording medium in the order white→yellow→cyan→magenta→black.

At least one type of colored liquid may be used, but in order to obtain a full-color image, it is preferable to use four colored liquids, that is, yellow, cyan, magenta, and black or five colored liquids, that is, yellow, cyan, magenta, black, and white. Furthermore, the present invention is not limited thereto, and eight colored liquids, that is, cyan, light cyan, magenta, light magenta, gray, black, white, and yellow may be used.

In the present invention, the inkjet recording method is not limited to the above-mentioned inkjet recording method, and the ink set for inkjet recording of the present invention may be applied to another inkjet recording method.

That is, a method known to a person skilled in the art may be selected as appropriate, such as a method in which, after an image is formed using a colored liquid, an undercoat liquid is discharged or applied as an overcoat layer.

Recording Medium

In the present invention, a material used for the recording medium is not particularly limited, and any material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. Preferred examples of a substrate include polyester film and aluminum plate.

In the present invention, as the recording medium, a non-absorbing recording medium is suitably used. In the inkjet recording method above, by applying a colored liquid after an undercoat liquid has been applied, it becomes possible to form a high precision image on various non-absorbing recording media, for which it has until now been difficult to form a high precision image due to fired droplet interference.

In accordance with the present invention, there can be provided an ink set for inkjet recording and an inkjet recording method that can suppress ink spreading effectively for any non-absorbing recording medium, give high image uniformity between various recording media, suppress the occurrence of nonuniformity in line width, color unevenness, etc. due to fired droplet interference, and give excellent fixation of an image to a recording medium and excellent color reproduction and storage stability.

EXAMPLES

The present invention is explained below in further detail by reference to Examples, but the present invention is not limited thereto.

Materials used in the present invention are as described below.

PB15:3 (IRGALITE BLUE GLO; manufactured by Ciba Specialty Chemicals, cyan pigment)
PV19 (CINQUASIA MAGENTA RT-355D; manufactured by Ciba Specialty Chemicals, magenta pigment)
PY120 (NOVOPERM YELLOW H2G; manufactured by Clariant, yellow pigment)
Carbon black (SPECIAL BLACK 250; manufactured by Degussa, black pigment)
Titanium oxide (CR60-2; manufactured by Ishihara Sangyo Kaisha Ltd., white pigment)
Rapicure DVE3 (triethylene glycol divinyl ether; manufactured by GAF, diluent)
DPGDA (dipropylene glycol diacrylate; Daicel-Cytec Company Ltd., polyfunctional monomer)
A-TMPT (trimethylolpropane triacrylate; manufactured by Shin-Nakamura Chemical Co., Ltd., polyfunctional monomer)
FA512A (dicyclopentenyloxyethyl acrylate (compound example (M-11)); manufactured by Hitachi Chemical Co., Ltd., monofunctional monomer)
BYK-307 (manufactured by BYK-Chemie, surfactant)
BYK-168 (manufactured by BYK-Chemie, dispersant)
Solsperse 5000 (manufactured by Noveon, dispersant)
Solsperse 36000 (manufactured by Noveon, dispersant)
FIRSTCURE ST-1 (manufactured by Albemarle, polymerization inhibitor)
DAROCUR TPO (manufactured by Ciba Specialty Chemicals, photopolymerization initiator)
IRGACURE 819 (manufactured by Ciba Specialty Chemicals, photopolymerization initiator)
IRGACURE 369 (2-benzyl-2-dimethylamino-1-(4-morpholinophenyl)-1-butanone; manufactured by Ciba Specialty Chemicals, photopolymerization initiator)
IRGACURE 907 (2-methyl-1-(4-methylthiophenyl)-2-morpholinopropan-1-one; manufactured by Ciba Specialty Chemicals, photopolymerization initiator)
Speedcure ITX (mixture of 2-isopropylthioxanthone and 4-isopropylthioxanthone; manufactured by Lambson, sensitizer)

| Preparation of cyan pigment dispersion A | |
| --- | --- |
| PB15:3 (IRGALITE BLUE GLO) | 30 parts by weight |
| Rapicure DVE3 | 50 parts by weight |
| BYK-168 | 20 parts by weight |

The above components were mixed and stirred using a stirrer for 1 hour. After stirring, the mixture was dispersed by means of a bead mill, thus giving cyan pigment dispersion A. Dispersion was carried out under conditions of 0.65 mm diameter zirconia beads packed at a packing ratio of 70%, a peripheral speed of 9 m/s, and a dispersion time of 3 hours. The cyan pigment dispersion A was obtained via the above-mentioned steps.

| Preparation of magenta pigment dispersion A | |
|---|---|
| PV19 (CINQUASIA MAGENTA RT-355D) | 30 parts by weight |
| Rapicure DVE3 | 28 parts by weight |
| BYK-168 | 42 parts by weight |

The above components were mixed and stirred using a stirrer for 1 hour. After stirring, the mixture was dispersed by means of a bead mill, thus giving magenta pigment dispersion A. Dispersion was carried out under conditions of 0.65 mm diameter zirconia beads packed at a packing ratio of 70%, a peripheral speed of 9 m/s, and a dispersion time of 6 hours. The magenta pigment dispersion A was obtained via the above-mentioned steps.

| Preparation of yellow pigment dispersion A | |
|---|---|
| PY120 (NOVOPERM YELLOW H2G) | 30 parts by weight |
| Rapicure DVE3 | 28 parts by weight |
| BYK-168 | 42 parts by weight |

The above components were mixed and stirred using a stirrer for 1 hour. After stirring, the mixture was dispersed by means of a bead mill, thus giving yellow pigment dispersion A. Dispersion was carried out under conditions of 0.65 mm diameter zirconia beads packed at a packing ratio of 70%, a peripheral speed of 9 m/s, and a dispersion time of 6 hours. The yellow pigment dispersion A was obtained via the above-mentioned steps.

| Preparation of black pigment dispersion A | |
|---|---|
| Carbon black (SPECIAL BLACK 250) | 40 parts by weight |
| Rapicure DVE3 | 29 parts by weight |
| BYK-168 | 30 parts by weight |
| Solsperse 5000 | 1 part by weight |

The above components were mixed and stirred using a stirrer for 1 hour. After stirring, the mixture was dispersed by means of a bead mill, thus giving black pigment dispersion A. Dispersion was carried out under conditions of 0.65 mm diameter zirconia beads packed at a packing ratio of 70%, a peripheral speed of 9 m/s, and a dispersion time of 3 hours. The black pigment dispersion A was obtained via the above-mentioned steps.

| Preparation of white pigment dispersion | |
|---|---|
| Titanium dioxide (CR60-2) | 60 parts by weight |
| DPGDA | 36 parts by weight |
| Solsperse 36000 | 4 parts by weight |

The above components were mixed and stirred using a stirrer for 1 hour. After stirring, the mixture was dispersed by means of a bead mill, thus giving white pigment dispersion A. Dispersion was carried out under conditions of 0.65 mm diameter zirconia beads packed at a packing ratio of 70%, a peripheral speed of 9 m/s, and a dispersion time of 3 hours. The white pigment dispersion A was obtained via the above-mentioned steps.

Preparation of Undercoat Liquids and Colored Liquids

Components shown in Table 1 to Table 5 (units: parts by weight) were stirred, mixed, and dissolved to give undercoat liquids and colored liquids. The surface tension of these undercoat liquids and colored liquids was measured at a liquid temperature of 25° C. by the Wilhelmy method using a surface tensiometer (e.g. a CBVP-Z surface tensiometer manufactured by Kyowa Interface Science Co., Ltd.). Values measured for the surface tension of the colored liquids were all in the range of 24 to 26 mN/m, and values measured for the surface tension of the undercoat liquids were in the range of 21 to 23 mN/m.

Components of magenta colored liquids M1 to M6 and the results of evaluation of the surface tension are given in the table below.

TABLE 1

| | Colored liquid (Magenta) | | | | | |
|---|---|---|---|---|---|---|
| Composition (parts by weight) | M1 | M2 | M3 | M4 | M5 | M6 |
| Magenta pigment dispersion A | 19.5 | 19.5 | 19.5 | 19.5 | 19.5 | 19.5 |
| Polymerizable compound A | 29.8 | 29.8 | 31.8 | 31.8 | 31.8 | 32.3 |
| Polymerizable compound B | 1.0 | 1.0 | 1.0 | 1.0 | 1.0 | 1.0 |
| Polymerizable compound C | 35.0 | 35.0 | 35.0 | 35.0 | 35.0 | 35.0 |
| Diluent A | — | — | — | — | — | — |
| Surfactant A | 0.1 | 0.1 | 0.1 | 0.1 | 0.1 | 0.1 |
| Inhibitor A | 0.1 | 0.1 | 0.1 | 0.1 | 0.1 | 0.1 |
| Initiator A | 3.5 | 3.5 | 3.5 | — | 5.5 | 4.0 |
| Initiator B | 3.5 | 3.5 | 3.5 | — | 5.0 | 4.0 |
| Initiator C | 3.5 | 3.5 | 3.5 | 5.5 | — | 4.0 |
| Initiator D | — | — | — | 5.0 | — | — |
| Sensitizer A | 4.0 | — | — | — | — | — |
| Sensitizer B | — | 4.0 | — | — | — | — |
| Sensitizer C | — | — | 2.0 | 2.0 | 2.0 | — |
| Surface tension (mN/m) | 25.6 | 25.6 | 25.5 | 25.4 | 25.5 | 25.5 |

Components of cyan colored liquids C1 to C6 and the results of evaluation of the surface tension are given in the table below.

TABLE 2

| | Colored liquid (Cyan) | | | | | |
|---|---|---|---|---|---|---|
| Composition (parts by weight) | C1 | C2 | C3 | C4 | C5 | C6 |
| Cyan pigment dispersion A | 7.2 | 7.2 | 7.2 | 7.2 | 7.2 | 7.2 |
| Polymerizable compound A | 36.2 | 36.2 | 38.2 | 38.2 | 38.2 | 38.7 |
| Polymerizable compound B | 1.0 | 1.0 | 1.0 | 1.0 | 1.0 | 1.0 |
| Polymerizable compound C | 35.0 | 35.0 | 35.0 | 35.0 | 35.0 | 35.0 |
| Diluent A | 5.5 | 5.5 | 5.5 | 5.5 | 5.5 | 5.5 |
| Surfactant A | 0.1 | 0.1 | 0.1 | 0.1 | 0.1 | 0.1 |
| Inhibitor A | 0.5 | 0.5 | 0.5 | 0.5 | 0.5 | 0.5 |
| Initiator A | 3.5 | 3.5 | 3.5 | — | 5.5 | 4.0 |
| Initiator B | 3.5 | 3.5 | 3.5 | — | 5.0 | 4.0 |
| Initiator C | 3.5 | 3.5 | 3.5 | 5.5 | — | 4.0 |
| Initiator D | — | — | — | 5.0 | — | — |
| Sensitizer A | 4.0 | — | — | — | — | — |
| Sensitizer B | — | 4.0 | — | — | — | — |
| Sensitizer C | — | — | 2.0 | 2.0 | 2.0 | — |
| Surface tension (mN/m) | 25.5 | 25.4 | 25.6 | 25.4 | 25.5 | 25.5 |

Components of yellow colored liquids Y1 to Y6 and the results of evaluation of the surface tension are given in the table below.

TABLE 3

| Composition (parts by weight) | Colored liquid (Yellow) | | | | | |
|---|---|---|---|---|---|---|
| | Y1 | Y2 | Y3 | Y4 | Y5 | Y6 |
| Yellow pigment dispersion A | 15.6 | 15.6 | 15.6 | 15.6 | 15.6 | 15.6 |
| Polymerizable compound A | 33.7 | 33.7 | 35.7 | 35.7 | 35.7 | 36.2 |
| Polymerizable compound B | 1.0 | 1.0 | 1.0 | 1.0 | 1.0 | 1.0 |
| Polymerizable compound C | 35.0 | 35.0 | 35.0 | 35.0 | 35.0 | 35.0 |
| Diluent A | — | — | — | — | — | — |
| Surfactant A | 0.1 | 0.1 | 0.1 | 0.1 | 0.1 | 0.1 |
| Inhibitor A | 0.1 | 0.1 | 0.1 | 0.1 | 0.1 | 0.1 |
| Initiator A | 3.5 | 3.5 | 3.5 | — | 5.5 | 4.0 |
| Initiator B | 3.5 | 3.5 | 3.5 | — | 5.0 | 4.0 |
| Initiator C | 3.5 | 3.5 | 3.5 | 5.5 | — | 4.0 |
| Initiator D | — | — | — | 5.0 | — | — |
| Sensitizer A | 4.0 | — | — | — | — | — |
| Sensitizer B | — | 4.0 | — | — | — | — |
| Sensitizer C | — | — | 2.0 | 2.0 | 2.0 | — |
| Surface tension (mN/m) | 26.0 | 26.1 | 26.0 | 25.9 | 25.9 | 26.0 |

Components of black colored liquids Bk1 to Bk6 and the results of evaluation of the surface tension are given in the table below.

TABLE 4

| Composition (parts by weight) | Colored liquid (Black) | | | | | |
|---|---|---|---|---|---|---|
| | Bk1 | Bk2 | Bk3 | Bk4 | Bk5 | Bk6 |
| Black pigment dispersion A | 8.3 | 8.3 | 8.3 | 8.3 | 8.3 | 8.3 |
| Polymerizable compound A | 35.5 | 35.5 | 37.5 | 37.5 | 37.5 | 38.0 |
| Polymerizable compound B | 1.0 | 1.0 | 1.0 | 1.0 | 1.0 | 1.0 |
| Polymerizable compound C | 35.0 | 35.0 | 35.0 | 35.0 | 35.0 | 35.0 |
| Diluent A | 5.5 | 5.5 | 5.5 | 5.5 | 5.5 | 5.5 |
| Surfactant A | 0.1 | 0.1 | 0.1 | 0.1 | 0.1 | 0.1 |
| Inhibitor A | 0.1 | 0.1 | 0.1 | 0.1 | 0.1 | 0.1 |
| Initiator A | 3.5 | 3.5 | 3.5 | — | 5.5 | 4.0 |
| Initiator B | 3.5 | 3.5 | 3.5 | — | 5.0 | 4.0 |
| Initiator C | 3.5 | 3.5 | 3.5 | 5.5 | — | 4.0 |
| Initiator D | — | — | — | 5.0 | — | — |
| Sensitizer A | 4.0 | — | — | — | — | — |
| Sensitizer B | — | 4.0 | — | — | — | — |
| Sensitizer C | — | — | 2.0 | 2.0 | 2.0 | — |
| Surface tension (mN/m) | 25.9 | 25.9 | 25.9 | 26 | 25.8 | 25.9 |

Components of white colored liquids W1 to W6 and the results of evaluation of the surface tension are given in the table below.

TABLE 5

| Composition (parts by weight) | Colored liquid (White) | | | | | |
|---|---|---|---|---|---|---|
| | W1 | W2 | W3 | W4 | W5 | W6 |
| White pigment dispersion A | 8.3 | 8.3 | 8.3 | 8.3 | 8.3 | 8.3 |
| Polymerizable compound A | 35.5 | 35.5 | 37.5 | 37.5 | 37.5 | 38.0 |
| Polymerizable compound B | 1.0 | 1.0 | 1.0 | 1.0 | 1.0 | 1.0 |
| Polymerizable compound C | 35.0 | 35.0 | 35.0 | 35.0 | 35.0 | 35.0 |
| Diluent A | 5.5 | 5.5 | 5.5 | 5.5 | 5.5 | 5.5 |
| Surfactant A | 0.1 | 0.1 | 0.1 | 0.1 | 0.1 | 0.1 |
| Inhibitor A | 0.1 | 0.1 | 0.1 | 0.1 | 0.1 | 0.1 |
| Initiator A | 3.5 | 3.5 | 3.5 | — | 5.5 | 4.0 |
| Initiator B | 3.5 | 3.5 | 3.5 | — | 5.0 | 4.0 |
| Initiator C | — | — | — | — | — | — |
| Initiator D | 3.5 | 3.5 | 3.5 | 10.5 | — | 4.0 |
| Sensitizer A | 4.0 | — | — | — | — | — |
| Sensitizer B | — | 4.0 | — | — | — | — |
| Sensitizer C | — | — | 2.0 | 2.0 | 2.0 | — |
| Surface tension (mN/m) | 24.1 | 24.0 | 24.1 | 24.2 | 23.9 | 24.1 |

Components of undercoat liquids U1 to U8 and the results of evaluation of the surface tension are given in the table below.

TABLE 6

| Composition (parts by weight) | Undercoat liquid | | | | | | | |
|---|---|---|---|---|---|---|---|---|
| | U1 | U2 | U3 | U4 | U5 | U6 | U7 | U8 |
| White pigment dispersion A | — | — | — | — | 25.0 | — | — | — |
| Polymerizable compound A | 51.8 | 51.8 | 51.8 | 51.8 | 51.8 | 51.8 | 51.8 | 51.8 |
| Polymerizable compound B | 1.0 | 1.0 | 1.0 | 1.0 | 1.0 | 1.0 | 1.0 | 1.0 |
| Polymerizable compound C | 35.0 | 35.0 | 35.0 | 35.0 | 10.0 | 37.0 | 37.0 | 35.0 |
| Diluent A | — | — | — | — | — | — | — | — |
| Surfactant A | 0.1 | 0.1 | 0.1 | 0.1 | 0.1 | 0.1 | 0.1 | 0.1 |
| Inhibitor A | 0.1 | 0.1 | 0.1 | 0.1 | 0.1 | 0.1 | 0.1 | 0.1 |
| Initiator A | 4.0 | 4.0 | 6.0 | — | 4.0 | 5.0 | 4.0 | 5.0 |
| Initiator B | 2.0 | 2.0 | 2.0 | — | 2.0 | 2.0 | 2.0 | 2.0 |
| Initiator C | — | — | — | — | — | — | — | — |
| Initiator D | 2.0 | 2.0 | — | 8.0 | 2.0 | 3.0 | 2.0 | 2.0 |
| Sensitizer A | 4.0 | — | 4.0 | 4.0 | — | — | — | — |
| Sensitizer B | — | 4.0 | — | — | 4.0 | — | — | — |
| Sensitizer C | — | — | — | — | — | — | 2.0 | 4.0 |
| Surface tension (mN/m) | 22.1 | 22.0 | 21.9 | 22.0 | 22.0 | 22.1 | 22.1 | 21.8 |

The compounds in the tables are as follows.

Polymerizable compound A: DPGDA (manufactured by Daicel-Cytec Company Ltd., polyfunctional monomer)

Polymerizable compound B: A-TMPT (manufactured by Shin-Nakamura Chemical Co., Ltd., polyfunctional monomer)

Polymerizable compound C: FA512A (manufactured by Hitachi Chemical Co., Ltd., monofunctional monomer)

Diluent A: Rapicure DVE3 (manufactured by GAF, diluent)

Surfactant A: BYK-307 (manufactured by BYK-Chemie, surfactant)

Inhibitor A: FIRSTCURE ST-1 (manufactured by Albemarle, polymerization inhibitor)

Initiator A: DAROCUR TPO (manufactured by Ciba Specialty Chemicals, photopolymerization initiator)

Initiator B: IRGACURE 819 (manufactured by Ciba Specialty Chemicals, photopolymerization initiator)

Initiator C: IRGACURE 369 (manufactured by Ciba Specialty Chemicals, photopolymerization initiator)

Initiator D: IRGACURE 907 (manufactured by Ciba Specialty Chemicals, photopolymerization initiator)

Sensitizer A: Chemical Formula A below

Sensitizer B: Chemical Formula B below

Sensitizer C: Speedcure ITX (manufactured by Lambson, sensitizer)

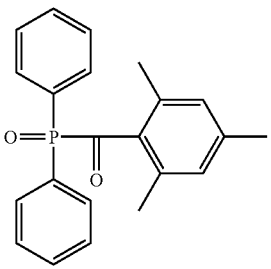

DAROCUR TPO

-continued

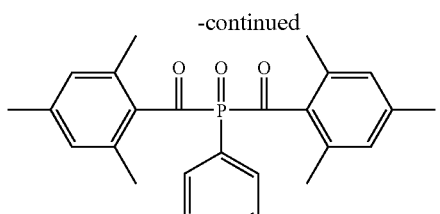
IRGACURE 819

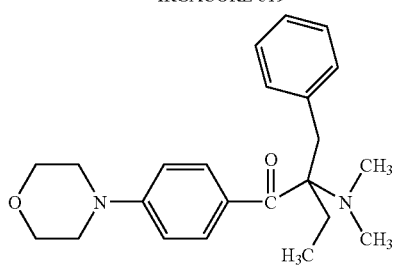
IRGACURE 369

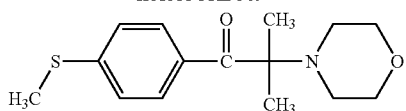
IRGACURE 907

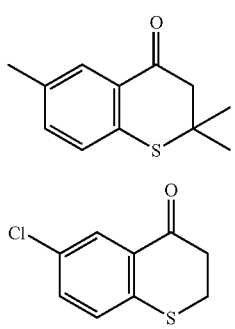

(A)

(B)

Image Recording System

An inkjet printer (equipped with heads manufactured by Toshiba Tec Corporation having a droplet firing frequency of 6.2 KHz, a number of nozzles of 636, a nozzle density of 300 npi (nozzles/inch, the same applies below), and a drop size variable in 7 stages from 6 pL to 42 pL with two heads arranged to give 600 npi, five sets of these heads being arranged in a full line as a head set) was charged with five colored liquids (M1 to M6, C1 to C6, Y1 to Y6, Bk1 to Bk6, and W1 to W6) prepared above.

The heads were fixed to a machine body in the order white, yellow, cyan, magenta, and black from upstream in the transport direction of a recording medium, and a roll coater and a semi-curing light source for an undercoat liquid were installed further upstream of the white ink head. As the undercoat liquid here, the undercoat liquids 1 to 8 (U1 to U8) were used.

The construction was such that the recording medium was able to move immediately beneath the head, a pinning light source (semi-curing light source) was installed in the advancing direction of the recording medium for each of the white, yellow, cyan, and magenta heads charged with the colored liquids (M1 to M6, C1 to C6, Y1 to Y6, W1 to W6), and five metal halide lamps (light intensity 3,000 mW/cm$^2$) were installed downstream of the black ink head.

As the semi-curing light source and the pinning light source, an LED light source was used. An NCCU033 manufactured by Nichia Corporation was employed as the LED. This LED outputs UV rays at 340 nm to 400 nm with a center wavelength of 365 nm from 1 chip, and by applying a current of about 500 mA, about 100 mW of light is emitted from the chip. A plurality of LEDs were arranged at intervals of 7 mm, and the current and the distance between the light source and a recording medium were adjusted so that the exposure intensity on the surface of the recording medium was about 100 mW/cm$^2$.

The irradiation energy of the metal halide lamps could be adjusted from 300 to 1,500 mJ/cm$^2$ by the number of metal halide lamps that were switched ON. Specifically, 300 mJ/cm$^2$ (1 lamp ON), 600 mJ/cm$^2$ (2 lamps ON), 900 mJ/cm$^2$ (3 lamps ON), 1,200 mJ/cm$^2$ (4 lamps ON), and 1,500 mJ/cm$^2$ (5 lamps ON).

Example 1

An image was formed on a plastic film A (white polyethylene) and a plastic film B (transparent polyethylene) using the above-mentioned image recording system in accordance with the procedure described below, thus giving a printed material.

The printing procedure involved (1) to (12) below.

(1) An undercoat liquid (U1) was uniformly applied at a thickness of 5 μm by the roll coater (coating speed 400 mm/s).

(2) After the undercoat liquid (U1) was applied, it was exposed to light using the semi-curing light source (light intensity 100 mW/cm$^2$), thus semi-curing the undercoat liquid (U1) applied.

(3) A white colored liquid (W1) was applied using the white head on top of the recording medium having the undercoat liquid applied thereto, thus forming a white image.

(4) Exposure to light was carried out using the pinning light source (light intensity 100 mW/cm$^2$), thus semi-curing the white colored liquid.

(5) A yellow colored liquid (Y1) was applied using the yellow head on top of the recording medium, thus forming a yellow image.

(6) Exposure to light was carried out using the pinning light source (light intensity 100 mW/cm$^2$), thus semi-curing the yellow colored liquid.

(7) A cyan colored liquid (C1) was applied on top of the recording medium using the cyan head, thus forming a cyan image.

(8) Exposure to light was carried out using the pinning light source (light intensity 100 mW/cm$^2$), thus semi-curing the cyan colored liquid.

(9) A magenta colored liquid (M1) was applied on top of the recording medium using the magenta head, thus forming a magenta image.

(10) Exposure to light was carried out using the pinning light source (light intensity 100 mW/cm$^2$), thus semi-curing the magenta colored liquid.

(11) A black colored liquid (Bk1) was applied on top of the recording medium using the black head, thus forming a black image.

(12) Exposure to light was carried out using the metal halide lamp (light intensity 3,000 mW/cm$^2$), thus completely curing the image. The exposure energy was adjusted from 300 to 1,500 mJ/cm$^2$ by the number of metal halide lamps switched ON.

The transport speed for the recording medium here was 400 mm/s, and the amount of colored liquid per dot was about 12 pL. When a tertiary color (e.g. cyan, magenta, and yellow)

image was formed, (3), (4), (10) and (11) were omitted from the above-mentioned procedure. When a secondary color (e.g. cyan and magenta) image was formed, (3) to (6), (10), and (11) were omitted from the above-mentioned procedure. When a primary color (e.g. yellow) image was formed, (3), (4), and (6) to (11) were omitted from the above-mentioned procedure. Furthermore, when plastic film A was used, the steps for applying white ink ((3) and (4)) were omitted.

Examples 2 to 16 and Comparative Examples 1 to 6

A recorded material (image) was formed in the same manner as in Example 1 except that the colored liquids and the undercoat liquids were replaced as described in Table 7. When an undercoat liquid (U5) containing a white pigment (ink set 5 and ink set 19) was used, a recorded material was obtained without using a white colored liquid (W1 to W6).
Measurement of Amount Transferred and Evaluation The maximum amount (weight) of colored liquid applied per unit area in steps (3), (5), (7), (9), and (11) in Examples 1 to 16 and Comparative Examples 1 to 6 was in the range of 0.74 mg/cm$^2$ to 0.87 mg/cm$^2$ for each colored liquid.

When the amount of undercoat liquid transferred was measured by the transfer test by pulling out a sample after exposure with the semi-curing light source and exposure with the pinning light source in steps (2), (4), (6), (7), (8), and (10), it was in the range of 0.10 mg/cm$^2$ to 0.12 mg/cm$^2$ for all of the steps.

Therefore, with respect to the amount (weight) transferred M (undercoat liquid) per unit area of the undercoat liquid layer and the maximum weight m (colored liquid) of the colored liquid discharged per unit area, the relationship {m (colored liquid)/10}≦{M (undercoat liquid)}≦m {(colored liquid)/5} is satisfied.

Moreover, the amount of white colored liquid transferred after exposure to the pinning light source in Step (4), the amount of yellow colored liquid transferred after exposure to the pinning light source in Step (6), the amount of cyan colored liquid transferred after exposure to the pinning light source in Step (8), and the amount of magenta colored liquid transferred after exposure to the pinning light source in Step (10) were measured by the transfer test by pulling out a sample after each step. For all of the colored liquids, the amount transferred per unit area was in the range of 0.10 mg/cm$^2$ to 0.12 mg/cm$^2$.

Therefore, in combinations of colored liquids having different colors, with respect to the weight M (colored liquid A) per unit area of the uncured part of colored liquid A previously applied on top of the recording medium and the maximum weight m (colored liquid B) of subsequently applied colored liquid B per unit area, the relationship {m (colored liquid B)/10}≦{M (colored liquid A)}≦m {(colored liquid B)/5} is satisfied.

The transfer test was carried out using, as a permeable medium, plain paper (C2 photocopy paper manufactured by Fuji Xerox Co., Ltd., product code V436). The plain paper was pressed with a uniform force (500 to 1,000 mN/cm$^2$) against the semi-cured undercoat liquid or semi-cured colored liquid on the recording medium that had been pulled out and allowed to stand for about 1 minute. Subsequently, the plain paper was gently peeled off, and the weight of the plain paper before and after the transfer test was measured and divided by the area of the image formed using the undercoat liquid and/or colored liquid, thus determining the amount (weight) transferred per unit area.
Evaluation Items
Tack-Free Sensitivity (Surface Curability)

Tack-free sensitivity was defined as the exposure energy at which tackiness on the printed surface disappeared.

The presence or absence of tackiness of the printed surface was determined by pressing plain paper (Photocopy paper C2, manufactured by Fuji Xerox Co., Ltd.) thereagainst immediately after printing; when the undercoat liquid and/or the colored liquid transferred, tackiness was present, and when there was no transfer, tackiness was absent.

The exposure energy was changed between 300 mJ/cm$^2$, 600 mJ/cm$^2$, 900 mJ/cm$^2$, 1,200 mJ/cm$^2$, and 1,500 mJ/cm$^2$.

The lower the tack-free sensitivity, the more preferable from the viewpoint of internal curability, and it is particularly preferable for it to be 1,000 mJ/cm$^2$ or below.

Figure 10:
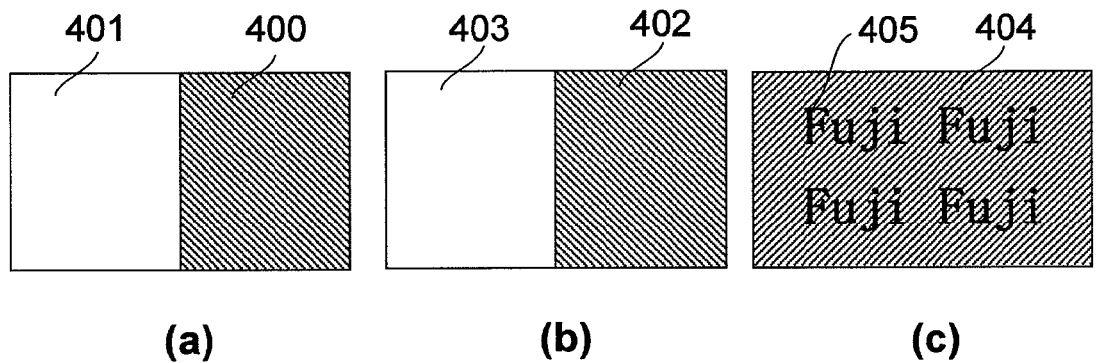
FIG. 10 is a schematic diagram showing printed materials formed in Examples.

The tack-free sensitivity was evaluated using printed material A (FIG. 10A). In FIG. 10A, 400 denotes a solid printed area formed using a primary color (cyan, magenta, yellow, black, or white), and a primary color solid image was printed at a pixel density of 600×600 dpi by applying a 12 pL liquid droplet of the colored liquid per pixel. 401 denotes an area where no colored liquid was applied, and the undercoat liquid was exposed on the surface.

When transparent undercoat liquids (U1 to U4, U6 to U8) were used, plastic film A was used as a recording medium, and when a white undercoat liquid (U5) was used, plastic film B was used as a recording medium.
Fingernail Scratch Sensitivity (Internal Curability)

The fingernail scratch sensitivity was defined as the exposure energy at which peeling or tearing of a coating by scratching with a fingernail after printing was prevented. A printed material was scratched 5 times by means of a guitar pick or a fingernail, and when the coating did not peel or tear, it was determined that there was no peeling or tearing of the coating by fingernail scratching.

The exposure energy was changed between 300 mJ/cm$^2$, 600 mJ/cm$^2$, 900 mJ/cm$^2$, 1,200 mJ/cm$^2$, and 1,500 mJ/cm$^2$.

The exposure energy at which peeling or tearing of the coating by fingernail scratching did not occur was evaluated as being the fingernail scratch sensitivity.

The lower the fingernail scratch sensitivity, the more preferable from the viewpoint of internal curability, and it is particularly preferable for it to be 1,000 mJ/cm$^2$ or below.

The fingernail scratch sensitivity was evaluated using printed material B (FIG. 10B). In FIG. 10B, 402 denotes a solid printed area formed using a tertiary color (white, cyan, and yellow) or a secondary color (cyan and yellow), and a tertiary or secondary color solid image was printed at a pixel density of 600×600 dpi for each color by applying a 12 pL liquid droplet of the colored liquid per pixel. 403 denotes an area where no colored liquid was applied, and the undercoat liquid was exposed on the surface.

When transparent undercoat liquids (U1 to U4, U6 to U8) were used, plastic film A was used as a recording medium, and a tertiary color image was formed. Furthermore, when a white undercoat liquid (U5) was used, plastic film B was used as a recording medium, and a secondary color image was formed.
Color Evaluation The color difference ΔE between a recording medium and a cured undercoat liquid coating was used as the basis for evaluating the influence of the undercoat liquid on color reproduction.

Plastic film A or plastic film B was coated with the undercoat liquid at a uniform thickness of 5 μm, and exposure was carried out using a metal halide lamp (light intensity 3,000 mW/cm$^2$), thus giving a cured coating. When a transparent undercoat liquid (U1 to U4, U6 to U8) was used, plastic film A was used as a recording medium, and when a white undercoat liquid (U5) was used, plastic film B was used as a recording medium.

The color difference ΔE was determined by calculation from the equation below by measuring the chromaticity (a*1, b*1) and luminance (L1) of the cured coating and the chromaticity (a*2, b*2) and luminance (L2) of plastic film A or plastic film B using an SPM100-II manufactured by Gretag.

$$\Delta E=\{(a*1-a*2)^2+(b*1-b*2)^2+(L1-L2)^2\}^{1/2}$$

Here, the smaller the ΔE, the more preferable it is from the viewpoint of color reproduction, and it is particularly preferable that ΔE<1.

Storage Stability (High Temperature)

Colored liquids and undercoat liquids (10 mL) were placed in sample bottles and stored in an environment of 60° C. for 4 weeks.

Storage stability at high temperature was evaluated using a change in ink viscosity before and after storage (Δ viscosity).

Δ viscosity=|viscosity before storage (mPa·s)−viscosity after storage (mPa·s)|

The viscosity before storage (mPa·s) and the viscosity after storage (mPa·s) were determined using a model RE80 viscometer manufactured by Toki Sangyo Co., Ltd. The model RE80 viscometer is a conical rotor/flat plate system E-type viscometer, and measurement was carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

The smaller the Δ viscosity, the more preferable it is from the viewpoint of storage stability, and it is particularly preferable that Δ viscosity<1.

Storage Stability (Low Temperature)

Undercoat liquids (10 mL) were placed in sample bottles and stored in an environment of −15° C. for 2 weeks.

Storage stability at low temperature was evaluated by the presence or absence of precipitation. The presence or absence of precipitation was determined by visual observation or by means of an optical microscope.

From the viewpoint of storage stability, it is preferable that there is no precipitation.

It was difficult to determine the presence or absence of precipitation for the colored liquid due to it containing a colorant. After the prepared colored liquid was stored in an environment of −15° C. for 2 weeks, the above-mentioned image recording system was charged therewith, a printing experiment was carried out, and problems such as poor discharge did not occur.

Similarly, it was difficult to determine the presence or absence of precipitation for the white undercoat liquid (U5) due to it containing a white pigment. After the undercoat liquid (U5) prepared was stored in an environment of −15° C. for 2 weeks, the above-mentioned image recording system was charged therewith, a printing experiment was carried out, and problems such as coating defects did not occur.

Character Reproduction

Character reproduction was visually evaluated using printed material with 10 pt characters in accordance with the evaluation criteria below. Evaluation of character reproduction was carried out at a maximum exposure illumination intensity of 1,500 mJ/cm².

Good: no interference between fired droplets, no spreading, no color mixing, and characters were printed clearly.

Poor: there was interference between fired droplets, spreading, and color mixing, and characters could not be identified.

Character reproduction was evaluated using printed material C (FIG. 10C). In FIG. 10C, 404 denotes a solid printed area (background solid printed area) formed using a tertiary color (white, cyan, and yellow) or a secondary color (cyan and yellow), which was printed at a pixel density of 600×600 dpi by applying a 12 pL liquid droplet of the colored liquid per pixel to give a background image. 405 denotes a black character area ('Fuji' (Times New Roman, 10 pt)), which was printed at a pixel density of 600×600 dpi by applying 12 pL of black colored liquid per pixel. When transparent undercoat liquids (U1 to U4, U6 to U8) were used, plastic film A was used as a recording medium, and a tertiary color image was formed. Furthermore, when a white undercoat liquid (U5) was used, plastic film B was used as a recording medium, and a secondary color image was formed.

Examination of Image Slice

Prints obtained by completely curing images formed using 5 types of primary colors, and secondary colors freely selected from 5 types of colored liquids were sectioned by means of a microtome and examined by an optical microscope (MM-40 Measuring Microscope: optical microscope manufactured by Nikon). The microtome used for obtaining a slice was an RM2255 microtome manufactured by Leica Microsystems.

In a primary color area of images obtained using the ink sets of Examples 1 to 16, as shown in FIG. 2, part of a colored liquid cured material 12 was exposed on the surface, and part thereof had sunk into an undercoat layer 14. Furthermore, the undercoat layer 14 was observed beneath the colored liquid cured material 12. Moreover, it was confirmed that a cured layer of the colored liquid was formed uniformly.

With regard to a secondary color area of the images obtained using the ink sets of Examples 1 to 16 (when formed from colored liquid A and colored liquid B), as shown in FIG. 6, part of the colored liquid B cured material 22 was exposed on the surface, and part thereof had sunk into the colored liquid A cured material 24. Furthermore, a layer of the colored liquid A cured material 24 was observed beneath the colored liquid B cured material 22. Moreover, it was confirmed that the cured layer of colored liquid B was uniform. On the other hand, the undercoat layer 14 was observed beneath the colored liquid A cured material 24.

TABLE 7

| Ink set | Under-coat liquid | Colored liquid | | | | | Tack-free sensitivity (mJ/cm²) | Fingernail scratch sensitivity (mJ/cm²) | Color evaluation | Storage stability (high temperature) | Storage stability (low temperature) | Character reproduction | Notes |
|---|---|---|---|---|---|---|---|---|---|---|---|---|---|
| | | White | Yellow | Cyan | Magenta | Black | | | | | | | |
| 1 | U1 | W1 | Y1 | C1 | M1 | Bk1 | 300 | 300 | ΔE < 1 | ΔViscosity < 1 | No precipitation | Good | Ex. 1 |
| 2 | U2 | W1 | Y1 | C1 | M1 | Bk1 | 300 | 300 | ΔE < 1 | ΔViscosity < 1 | No precipitation | Good | Ex. 2 |
| 3 | U3 | W1 | Y1 | C1 | M1 | Bk1 | 300 | 300 | ΔE < 1 | ΔViscosity < 1 | No precipitation | Good | Ex. 3 |
| 4 | U4 | W1 | Y1 | C1 | M1 | Bk1 | 300 | 600 | ΔE < 1 | ΔViscosity < 1 | No precipitation | Good | Ex. 4 |
| 5 | U5 | — | Y1 | C1 | M1 | Bk1 | 300 | 600 | ΔE < 1 | ΔViscosity < 1 | — | Good | Ex. 5 |
| 6 | U6 | W1 | Y1 | C1 | M1 | Bk1 | 300 | 1500 | ΔE < 1 | ΔViscosity < 1 | No precipitation | Good | Comp. Ex. 1 |

TABLE 7-continued

|  |  | Colored liquid | | | | Items evaluated | | | | | | |
|---|---|---|---|---|---|---|---|---|---|---|---|---|
| Ink set | Under-coat liquid | White | Yellow | Cyan | Magenta | Black | Tack-free sensitivity (mJ/cm²) | Fingernail scratch sensitivity (mJ/cm²) | Color evaluation | Storage stability (high temperature) | Storage stability (low temperature) | Character reproduction | Notes |
| 7 | U7 | W1 | Y1 | C1 | M1 | Bk1 | 300 | 1200 | ΔE < 1 | ΔViscosity < 1 | No precipitation | Good | Comp. Ex. 2 |
| 8 | U8 | W1 | Y1 | C1 | M1 | Bk1 | 300 | 300 | ΔE > 1 | ΔViscosity < 1 | Precipitated | Good | Comp. Ex. 3 |
| 9 | U1 | W1 | Y1 | C1 | M1 | Bk1 | 300 | 300 | ΔE < 1 | ΔViscosity < 1 | No precipitation | Good | Ex. 6 |
| 10 | U1 | W2 | Y2 | C2 | M2 | Bk2 | 300 | 300 | ΔE < 1 | ΔViscosity < 1 | No precipitation | Good | Ex. 7 |
| 11 | U1 | W3 | Y3 | C3 | M3 | Bk3 | 300 | 300 | ΔE < 1 | ΔViscosity < 1 | No precipitation | Good | Ex. 8 |
| 12 | U1 | W4 | Y4 | C4 | M4 | Bk4 | 300 | 600 | ΔE < 1 | ΔViscosity < 1 | No precipitation | Good | Ex. 9 |
| 13 | U1 | W5 | Y5 | C5 | M5 | Bk5 | 600 | 600 | ΔE < 1 | ΔViscosity < 1 | No precipitation | Good | Ex. 10 |
| 14 | U1 | W6 | Y6 | C6 | M6 | Bk6 | 900 | 900 | ΔE < 1 | ΔViscosity < 1 | No precipitation | Good | Ex. 11 |
| 15 | U1 | W6 | Y6 | C6 | M6 | Bk6 | 900 | 900 | ΔE < 1 | ΔViscosity < 1 | No precipitation | Good | Ex. 12 |
| 16 | U2 | W6 | Y6 | C6 | M6 | Bk6 | 900 | 900 | ΔE < 1 | ΔViscosity < 1 | No precipitation | Good | Ex. 13 |
| 17 | U3 | W6 | Y6 | C6 | M6 | Bk6 | 900 | 900 | ΔE < 1 | ΔViscosity < 1 | No precipitation | Good | Ex. 14 |
| 18 | U4 | W6 | Y6 | C6 | M6 | Bk6 | 900 | 900 | ΔE < 1 | ΔViscosity < 1 | No precipitation | Good | Ex. 15 |
| 19 | U5 | — | Y6 | C6 | M6 | Bk6 | 900 | 900 | ΔE < 1 | ΔViscosity < 1 | — | Good | Ex. 16 |
| 20 | U6 | W6 | Y6 | C6 | M6 | Bk6 | 900 | 1500 | ΔE < 1 | ΔViscosity < 1 | No precipitation | Good | Comp. Ex. 4 |
| 21 | U7 | W6 | Y6 | C6 | M6 | Bk6 | 900 | 1200 | ΔE < 1 | ΔViscosity < 1 | No precipitation | Good | Comp. Ex. 5 |
| 22 | U8 | W6 | Y6 | C6 | M6 | Bk6 | 900 | 900 | ΔE > 1 | ΔViscosity < 1 | Precipitated | Good | Comp. Ex. 6 |

What is claimed is:

1. An ink set for inkjet recording, comprising at least:

a colored liquid comprising at least a radically polymerizable compound, a photopolymerization initiator, and a colorant; and an undercoat liquid comprising at least a radically polymerizable compound and a photopolymerization initiator, the undercoat liquid comprising a sensitizer represented by Formula (I-C) below,

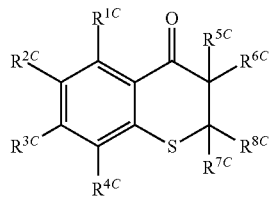

(I-C)

wherein $R^{1C}$, $R^{2C}$, $R^{3C}$, $R^{4C}$, $R^{5C}$, $R^{6C}$, $R^{7C}$, and $R^{8C}$ independently denote a hydrogen atom, a halogen atom, an alkyl group, a hydroxy group, a cyano group, a nitro group, an amino group, an alkylthio group, an alkylamino group, an alkoxy group, an alkoxycarbonyl group, an acyloxy group, an acyl group, a carboxyl group, or a sulfo group, wherein the undercoat liquid either comprises no colorant other than a white pigment, or comprises a colorant other than a white pigment in an amount of not greater than 1 wt % relative to the total weight of the undercoat layer, wherein the undercoat liquid comprises as the photopolymerization initiator at least one compound selected from the group consisting of an acylphosphine oxide compound and an α-aminoacetophenone compound, and wherein the colored liquid and the undercoat liquid are solvent-free.

2. The ink set for inkjet recording according to claim 1, wherein the amount added of the sensitizer represented by Formula (I-C) is 0.1 to 15.0 wt % relative to the total weight of the undercoat liquid.

3. The ink set for inkjet recording according to claim 1, wherein the α-aminoacetophenone compound is represented by Formula (d) below,

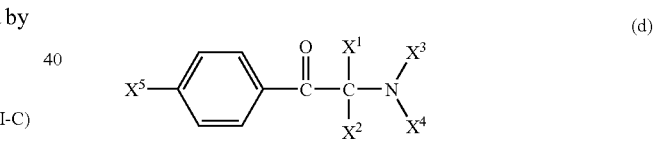

(d)

in Formula (d), $X^1$ and $X^2$ independently denote a methyl group, an ethyl group, or a benzyl group, $-NX^3X^4$ denotes a dimethylamino group, a diethylamino group, or a morpholino group, $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group, and the benzyl group may be substituted with an alkyl group having at least 1 but no greater than 4 carbons.

4. The ink set for inkjet recording according to claim 1, wherein the acylphosphine oxide compound is represented by Formula (2) or Formula (3),

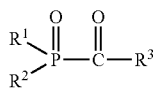

(2)

in Formula (2), $R^1$ and $R^2$ independently denote an aliphatic group, an aromatic group, an aliphatic oxy group, an aromatic oxy group, or a heterocyclic group, $R^3$ denotes an aliphatic group, an aromatic group, or a heterocyclic group, $R^1$ and $R^2$ may be bonded to form a 5-membered to 9-membered ring, and the ring structure may be a heterocycle having an oxygen atom, a nitrogen atom, a sulfur atom, etc, in the ring structure,

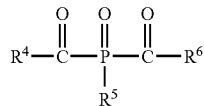
(3)

in Formula (3), $R^4$ and $R^6$ independently denote an alkyl group, an aryl group, or a heterocyclic group, and $R^5$ denotes an alkyl group, an aryl group, an alkoxy group, an aryloxy group, or a heterocyclic group.

5. The ink set for inkjet recording according to claim 1, wherein the colored liquid comprises a sensitizer represented by Formula (I-C) as set forth in claim 1.

6. The ink set for inkjet recording according to claim 1, wherein the colored liquid comprises as the photopolymerization initiator at least one type of compound selected from the group consisting of an acylphosphine oxide compound and an α-aminoacetophenone compound.

7. The ink set for inkjet recording according to claim 1, wherein the undercoat liquid comprises a surfactant.

8. The ink set for inkjet recording according to claim 1, wherein when the surface tension of the colored liquid is γA and the surface tension of the undercoat liquid is γB, γA>γB is satisfied.

9. The ink set for inkjet recording according to claim 1, wherein the surface tension (γA) of the colored liquid and the surface tension (γB) of the undercoat liquid satisfy γA−γB≧2.

10. The ink set for inkjet recording according to claim 1, wherein $R^{2C}$ denotes a chlorine atom, a fluorine atom or a bromine atom, $R^{1C}$ and $R^{8C}$ independently denote a hydrogen atom or a methyl group, and $R^{1C}$, $R^{3C}$, $R^{4C}$, $R^{5C}$, and $R^{6C}$ denote a hydrogen atom.

11. The ink set for inkjet recording according to claim 1, wherein $R^{2C}$ denotes a chlorine atom, a fluorine atom or a bromine atom, $R^{7C}$ and $R^{8C}$ independently denote a hydrogen atom or a methyl group, $R^{7C}$ and $R^{8C}$ do not denote a hydrogen atom at the same time, and $R^{1C}$, $R^{3C}$, $R^{4C}$, $R^{5C}$, and $R^{6C}$ denote a hydrogen atom.

12. The ink set for inkjet recording according to claim 1, wherein the colorant is one selected from the group consisting of a phthalocyanine pigment, a quinacridone pigment, a carbon black, and a benzimidazolone pigment.

13. The ink set for inkjet recording according to claim 1, wherein the colorant is a carbon black.

14. The ink set for inkjet recording according to claim 1, wherein the undercoat liquid comprises a sensitizer selected from the compounds represented by Formulae (A) to (G) below:

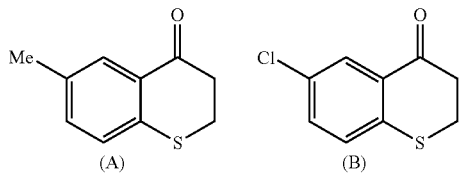

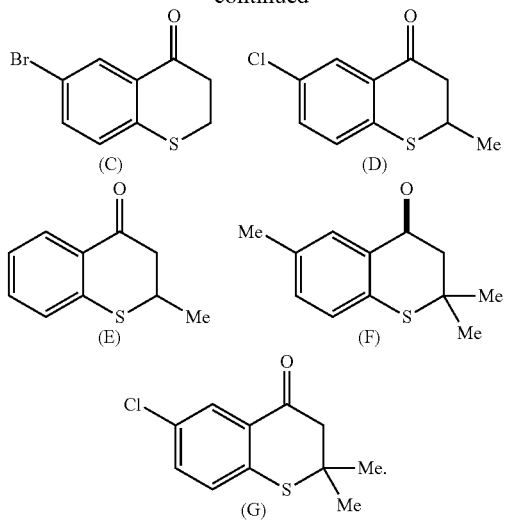

15. The ink set for inkjet recording according to claim 1, wherein the undercoat liquid comprises a sensitizer represented by Formula (B) or (F) below:

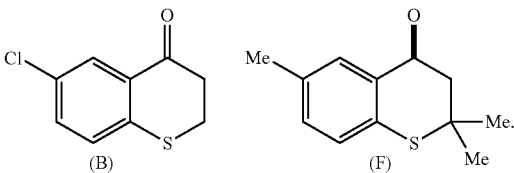

16. An inkjet recording method employing the ink set for inkjet recording according to claim 1, the method comprising:
a step of applying the undercoat liquid on top of a recording medium;
a step of semi-curing the undercoat liquid; and
a step of carrying out image formation by discharging the colored liquid on top of the semi-cured undercoat liquid.

17. The inkjet recording method according to claim 16 and further comprising discharging a colored liquid A and colored liquid B having different colors, wherein the method comprises
a step of semi-curing the colored liquid A, and
a step of discharging the colored liquid B on top of the semi-cured colored liquid A.

18. The inkjet recording method according to claim 16, wherein the semi-curing step is a step of semi-curing by irradiation with actinic radiation.

19. The inkjet recording method according to claim 16, wherein the semi-curing step is a step of irradiating with UV rays.

20. The inkjet recording method according to claim 17, wherein UV rays for semi-curing the undercoat liquid and/or UV rays for semi-curing colored liquid A comprise UV rays having a wavelength of at least 340 nm but no greater than 400 nm.

21. The inkjet recording method according to claim 16, wherein the amount of undercoat liquid applied to the recording medium is at least 0.05 times but no greater than 5 times the maximum amount of colored liquid applied.

* * * * *